(12) United States Patent
Toriyama

(10) Patent No.: US 8,577,149 B2
(45) Date of Patent: Nov. 5, 2013

(54) STORAGE MEDIUM STORING PROGRAM AND INFORMATION PROCESSING APPARATUS

(75) Inventor: Kazuyoshi Toriyama, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1701 days.

(21) Appl. No.: 11/398,527

(22) Filed: Apr. 6, 2006

(65) Prior Publication Data

US 2006/0288004 A1  Dec. 21, 2006

(30) Foreign Application Priority Data

Jun. 15, 2005 (JP) .................................. 2005-175397

(51) Int. Cl.
*G06F 17/30* (2006.01)
*G06F 17/21* (2006.01)
*G06F 17/00* (2006.01)

(52) U.S. Cl.
USPC ............. 382/189; 382/314; 704/10; 707/706; 715/230

(58) Field of Classification Search
USPC .......... 382/189, 181, 186, 314; 707/6; 704/10
See application file for complete search history.

(56) References Cited

U.S. PATENT DOCUMENTS

| | | | |
|---|---|---|---|
| 4,727,588 A * | 2/1988 | Fox et al. ...................... | 382/189 |
| 5,926,566 A * | 7/1999 | Wang et al. ................... | 382/185 |
| 6,331,867 B1 * | 12/2001 | Eberhard et al. .............. | 715/864 |
| 2003/0050773 A1 * | 3/2003 | Martinez et al. ............... | 704/10 |
| 2004/0205653 A1 * | 10/2004 | Hadfield et al. .............. | 715/530 |
| 2004/0234932 A1 * | 11/2004 | Hughes et al. ................. | 434/236 |
| 2005/0114283 A1 * | 5/2005 | Pearson et al. ................. | 706/50 |

FOREIGN PATENT DOCUMENTS

| | | |
|---|---|---|
| JP | 9-120403 | 5/1997 |
| JP | 2005-117629 | 4/2005 |

OTHER PUBLICATIONS

Issue A1, "MONO magazine No. 516", World Photo Press Co., Apr. 16, 2005, pp. 36-37.
Issue A2, "MONO magazine No. 520", World Photo Press Co., Jun. 16, 2005, p. 172.
Issue B1, "Goods Press the July issue", Tokuma Shoten Publishing Co., Ltd., Jun. 6, 2005, p. 130.
Printing A1, http://www.nintendo.co.jp/ds/adjj/index.html, Nintendo Co., Ltd., May 31, 2005.
Office Action in related copending Japanese Application No. JP2005-175397 dated Dec. 10, 2010.
Tronware 2002 vol. 77, Personal Media Corp., Oct. 10, 2002, pp. 72-77.
Office Action mailed Jul. 30, 2013 in counterpart Japanese Patent Application No. 2005-175397 and English translation thereof.

\* cited by examiner

*Primary Examiner* — Brian Q Le
*Assistant Examiner* — Michael Vanchy, Jr.
(74) *Attorney, Agent, or Firm* — Nixon & Vanderhye, P.C.

(57) ABSTRACT

Sentence data corresponding to headword data is retrieved from a data group including sentence data in the form of text data in accordance with a user's operation, and is displayed as a sentence image on a display screen. The display screen can be edited in accordance with a coordinate point output from coordinate input means. An edited sentence image is transmitted to other apparatuses.

18 Claims, 25 Drawing Sheets

F I G. 1 8
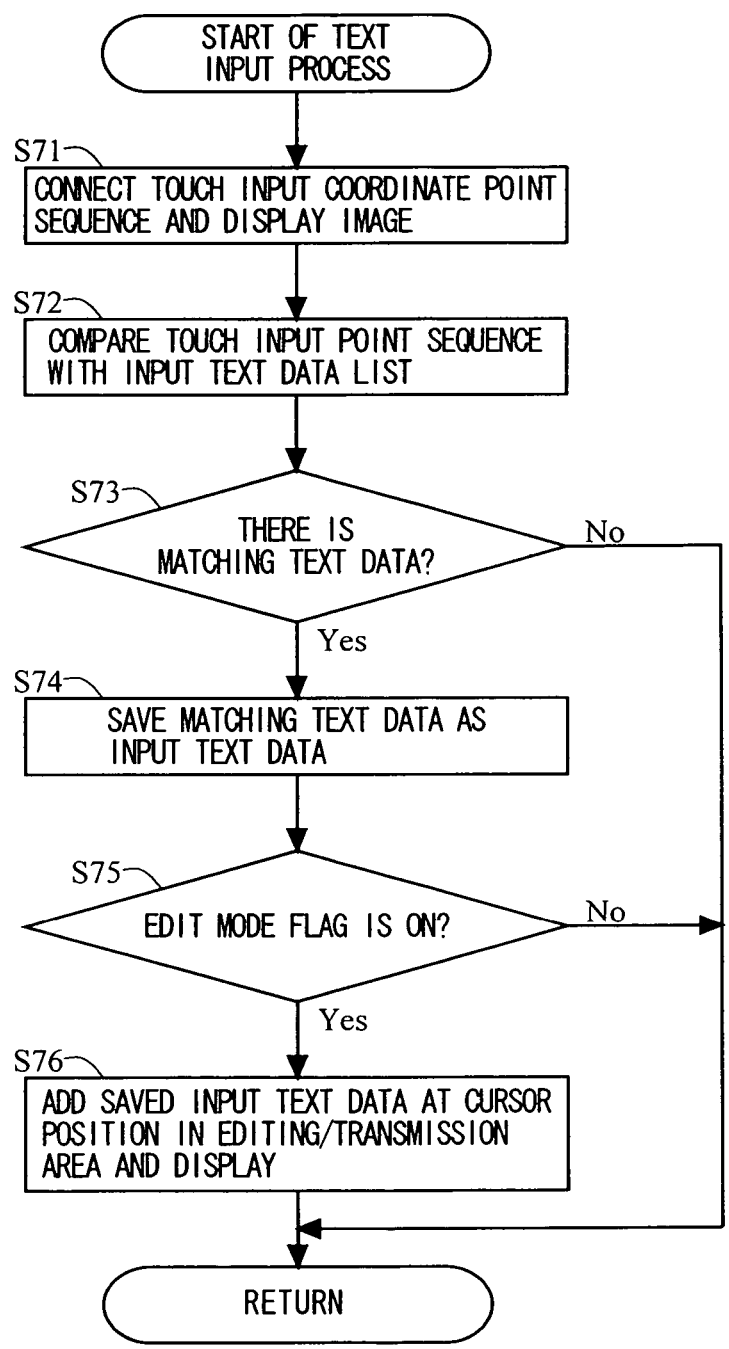

STORAGE MEDIUM STORING PROGRAM AND INFORMATION PROCESSING APPARATUS

CROSS REFERENCE TO RELATED APPLICATION

The disclosure of Japanese Patent Application No. 2005-175397 is incorporated herein by reference.

TECHNICAL FIELD

The present invention relates to a storage medium storing a program, an information processing apparatus, and an information processing system, and more particularly to, a storage medium storing a program which is used in a computer included in an information processing apparatus which wirelessly transmits edited data, the information processing apparatus, and an information processing system.

BACKGROUND AND SUMMARY

Conventionally, an electronic book which is digital data of a book stored in an electronic medium and is viewed on an information terminal, has been developed. Examples of a book which is to be converted into digital data as an electronic book include general books, dictionaries, textbooks, educational materials, and the like. Character data of these books can be displayed on a display screen. For example, Japanese Patent Laid-Open Publication No. 9-120403 (hereinafter referred to as Patent Document 1) discloses an information search device which searches an electronic dictionary which is digital data of a dictionary stored in an electronic medium, for information, using a display tablet.

However, in the information search device disclosed in Patent Document 1, when a word is selected, information about a meaning of the word is only displayed, simply for practical purposes. A plurality of users may want to view retrieved meaning information, however, the retrieved meaning information can be viewed only on the display screen of an information search device equipped with an electronic dictionary. Even when a plurality of users use respective information search devices equipped with the same electronic dictionary, the users need to perform the same search operation so as to view the same meaning information. In other words, it is difficult for a plurality of users to share retrieved meaning information.

Therefore, a feature of the present invention is to provide a storage medium storing a program which proposes a new application for electronic book data, such as an electronic dictionary or the like, an information processing apparatus, and an information processing system.

The present invention has the following features. Note that reference characters or step numbers in parentheses (a step executed by the CPU core 21 is abbreviated as "S", and only a step number is described) indicate correspondence to an embodiment described below for the purpose of understanding of the present invention, not limiting the scope of the present invention.

A first aspect of the present invention is directed to a storage medium storing a program which is executed by a computer (21) of an apparatus (1) which displays an image on a display screen (11, 12) and is operated by coordinate input means (15) for outputting a coordinate point (Db1) based on a predetermined coordinate system on the display screen. The program causes the computer to execute an input receiving step (S53), a search step (S102, S103), a display control step (S52, S76, S86, S89, S91, S104, S107, S112, S117, S133), a coordinate detecting step (S53), an editing step (S58, 5133, 5126 to S130), and a transmitting step (S142 to S146). The input receiving step receives an input corresponding to a user's operation. The search step determines headword data (search word) corresponding to the input (Db4) received in the input receiving step and searches, for sentence data (Db3) corresponding to the headword data, a data group (Da3) including at least sentence data in the form of text data corresponding to a plurality of pieces of headword data. The display control step displays, on the display screen, at least a portion of a sentence image based on the sentence data retrieved in the search step (S104). The coordinate detecting step detects a coordinate point output from the coordinate input means. The editing step edits the sentence image displayed by the display control step in accordance with the coordinate point detected by the coordinate detecting step. The transmitting step transmits the sentence image (Db7) edited by the editing step, via communications means (33) for transmitting data to another apparatus (1r), to another apparatus (1r). Note that the coordinate input means is an input device which designates an input position or coordinate point on a screen, and is implemented as a pointing device, such as a touch panel, a mouse, a track pad, a track ball, or the like. A coordinate system used in each input device is a touch panel coordinate system or a screen coordinate system.

In a second aspect based on the first aspect, the display screen includes a first area (W1) and a second area (W2), and in the second area, a screen coordinate point can be designated by the coordinate input means. The display control step displays at least a portion of the sentence image based on the sentence data retrieved by the search step, on the first area. The program causes the computer to further execute a copying step (S110, S112) of copying and storing at least a portion of the sentence image (Db3) displayed in the first area into a memory (24). The display control step displays the sentence image (Db5) copied by the copying step in the second area. The editing step edits the sentence image displayed in the second area in accordance with the coordinate point detected by the coordinate detecting step.

In a third aspect based on the second aspect, the copying step includes a copy range setting step (S106) and a copy range moving step (S107). The copy range setting step sets a copy range (Ac) within which the sentence image displayed in the first area is copied to the second area. The copy range moving step moves the copy range in accordance with the input received by the input receiving step.

In a fourth aspect based on the second aspect, the display screen further includes a third area (W3) which is different from the first area and the second area, and in which a screen coordinate point can be designated by the coordinate input means. The program causes the computer to further execute a character recognizing step (S57) and a headword data candidate setting step. The character recognizing step recognizes a character input in the third area in accordance with a time-series coordinate point sequence (Db2) connecting coordinate points detected by the coordinate detecting step in the third area. The headword data candidate setting step sets a candidate for the headword data (candidate for a search word in W5) corresponding to the character (a text in W4) recognized by the character recognizing step when the search step searches for sentence data. After the sentence data is searched for by the search step, the editing step adds the character (Ta) recognized by the character recognizing step to a predetermined position (position C) in the sentence image (W2 in FIG. 7). The display control step displays the headword data candidate set by the headword data candidate step in the second area when the search step searches for the sentence data corresponding to the character recognized by the character recognizing step (FIGS. 24 and 25). The display control step adds and displays the recognized character to the sentence image copied by the copying step at a predetermined position when the editing step edits the sentence image in accordance with the character recognized by the character recognizing step (FIG. 7).

In a fifth aspect based on the first aspect, the program causes the computer to further execute a communications status monitoring step (S60). The communications status monitoring step regularly monitors a communications status between the apparatus and another apparatus via the communications means. When the communications status monitoring step detects occurrence of communications error between the apparatus and the other apparatus, the display control step displays information (IF) notifying of the occurrence of the communications error on the display screen (S61).

In a sixth aspect based on the first aspect, the program causes the computer to further execute an image adding step (S111). When the display control step displays at least a portion of the sentence image on the display screen, the image adding step provides an area which the editing step cannot edit, adds an image (M) indicating a production source of the sentence data to the sentence image, and displays the image in the area in which the display screen cannot be edited.

In a seventh aspect based on the first aspect, the program causes the computer to further execute a production source data generating step. The production source data generating step generates production source data indicating a production source of the sentence data. The transmitting step transmits the sentence image edited by the editing step together with the production source data, the sentence image being integrated with the production source data.

In an eighth aspect based on the first aspect, the production source data generating step generates a production source image describing a name of the production source as the production source data. The transmitting step combines and transmits the sentence image edited by the editing step with the production source image.

In a ninth aspect based on the first aspect, the program causes the computer to further execute a production source data generating step and a production source image combining step. The production source data generating step generates a production source image describing a name of a production source of the sentence data. The production source image combining step combines the production source image in a partial area of the sentence image based on the sentence data retrieved by the search step. The display control step displays the sentence image combined by the production source image combining step on the display screen. The editing step edits the combined sentence image in accordance with the coordinate point detected by the coordinate detecting step, and does not edit an area in which the production source image is displayed.

In a tenth aspect based on the first aspect, the program causes the computer to further execute a converting step (S110). The converting step converts the sentence data (Db3) in the form of text data retrieved by the search step into a sentence image (Db5) in the form of image data to be displayed on the display screen. The display control step uses the sentence image in the form of image data converted by the converting step to display at least a portion of the sentence image on the display screen.

In an eleventh aspect based on the tenth aspect, the editing step includes superposing and combining image data drawn based on the coordinate point detected by the coordinate detecting step with the image data of the sentence image (S90). The transmitting step transmits the image data (Db7) of the sentence image combined by the editing step to another apparatus.

In a twelfth aspect based on the eleventh aspect, the program causes the computer to further execute a drawing step (S90). The drawing step draws a time-series coordinate point sequence (Db2) connecting coordinate points detected by the coordinate detecting step. The editing step superposes and combines image data corresponding to the image (Ia) drawn by the drawing step with the image data of the sentence image.

In a thirteenth aspect based on the tenth aspect, the editing step includes superposing text data (Db6) corresponding to the coordinate points detected by the coordinate detecting step onto the image data of the sentence image (S76, S85), and converting the superposed text data into image data and combining the image data with the image data of the sentence data with predetermined timing (S142, S143). The transmitting step transmits the image data of the sentence image combined by the editing step to another apparatus.

In a fourteenth aspect based on the thirteenth aspect, the program causes the computer to further execute a character recognizing step (S72 to S74). The character recognizing step recognizes an input character in accordance with the time-series coordinate point sequence connecting the coordinate points detected by the coordinate detecting step. The editing step superposes text data (Db4) corresponding to the character recognized by the character recognizing step onto the image data of the sentence image.

In a fifteenth aspect based on the thirteenth aspect, the program causes the computer to further execute a character selecting step (S126) and a character moving step (S127 to S129, S83 to S85). The character selecting step selects a character (Tb) in accordance with the coordinate points detected by the coordinate detecting step. The character moving step moves the character selected by the character selecting step in accordance with the coordinate points detected by the coordinate detecting step onto the sentence image displayed on the display screen. The editing step superposes text data corresponding to the character moved onto the character image by the character moving step on the image data of the sentence image.

In a sixteenth aspect based on thirteenth aspect, the editing step includes deleting the text data superposed on the image data of the sentence data, in accordance with the coordinate points detected by the coordinate detecting step (S89).

A seventeenth aspect of the present invention is directed to an information processing apparatus which displays an image on a display screen and is operated by coordinate input means for outputting a coordinate point based on a predetermined coordinate system on the display screen. The information processing apparatus comprises input receiving means, search means, display control means, coordinate detecting means, editing means, and transmitting means. The input receiving means receives an input corresponding to a user's operation. The search means determines headword data corresponding to the input received in the input receiving means and searches, for sentence data corresponding to the headword data, a data group including at least sentence data in the form of text data corresponding to a plurality of pieces of headword data. The display control means displays, on the display screen, at least a portion of a sentence image based on the sentence data retrieved in the search means. The coordinate detecting means detects a coordinate point output from the coordinate input means. The editing means edits the sentence image displayed by the display control means in accordance with the coordinate point detected by the coordinate detecting means. The transmitting means transmits the sentence image edited by the editing means, via communications means for transmitting data to another apparatus, to another apparatus.

An eighteenth aspect of the present invention is directed to an information processing system including a plurality of information processing apparatuses which display an image on a display screen and are operated by coordinate input means for outputting a coordinate point based on a predetermined coordinate system on the display screen. The information processing apparatuses comprises coordinate detecting means, image generating means, receiving means, first display control means, first editing means, and transmitting means. The coordinate detecting means detects a coordinate point output from the coordinate input means. The image generating means generates an image in accordance with the coordinate point detected by the coordinate detecting means. The receiving means receives an image transmitted from another one of the information processing apparatuses. The first display control means displays the image received by the receiving means on the display screen. The first editing means edits the image displayed by the first display control means in accordance with the coordinate point detected by the coordinate detecting means. The transmitting means transmits the image generated by the image generating means or the image edited by the first editing means to another one of the information processing apparatuses. At least one of the plurality of information processing apparatus further comprises input receiving means, search means, second display control means, and second editing means. The input receiving means receives an input corresponding to a user's operation. The search means determines headword data corresponding to the input received in the input receiving means and searches, for sentence data corresponding to the headword data, a data group including at least sentence data in the form of text data corresponding to a plurality of pieces of headword data. The second display control means displaying, on the display screen, at least a portion of a sentence image based on the sentence data retrieved in the search means. The second editing means edits the image displayed by the second display control means in accordance with the coordinate point detected by the coordinate detecting means. The image edited by the second editing means is transmitted via the transmitting means to another one of the information processing apparatuses. The first editing means and the second editing means may be the same or different from each other.

According to the first aspect, sentence data which is retrieved corresponding to headword in an electronic dictionary or the like can be easily edited and transmitted to other apparatuses. In other words, the sentence data of the electronic dictionary or the like can be used as a communication tool in new applications. Using a receiver-side apparatus, a user can view an image of the edited sentence data, and the image includes character information retrieved from the electronic dictionary or the like, so that the character information can also be viewed. In other words, a plurality of users can share and view the character information retrieved from the electronic dictionary or the like. In addition, when a character string cited from an electronic dictionary or the like is transmitted to other apparatuses, a required portion can be edited by a user to produce data to be transmitted. Therefore, it is more convenient than when the character string is input on a character-by-character basis, whereby the operability for the user is improved. For example, when sentence expression of retrieved sentence data (explanation of a term in a dictionary) is difficult, the user adds and transmits a comment, thereby making it possible to effectively use the editing function. In addition, retrieved sentence data, a portion of which is concealed, is transmitted as a question to a user of a transmission destination. In this case, for example, an effect that parties on both ends study together is expected, thereby making it possible to more effectively use the editing function.

According to the second aspect, retrieved sentence data is copied to an area for editing, whereby the copied sentence data can be handled as an image to be edited and transmitted, separately from other data.

According to the third aspect, it is possible to arbitrarily set a range to be edited and transmitted from retrieved sentence data.

According to the fourth aspect, when a coordinate point sequence is recognized as a character so that the character is input, a screen suitable for an application of the character is displayed. Specifically, when the recognized character is used for a search for sentence data, search candidate (s) set from the recognized character are displayed in a second area. When the recognized character is used for editing of sentence image, the recognized character is added to a predetermined position of a sentence image and is displayed in the second area.

According to the fifth aspect, when communications error occurs in communication with another apparatus in a process, that matter is displayed. Therefore, the user can revamp communications settings with respect to the other apparatus.

According to the sixth aspect, a description which cannot be edited by the user can be added to a sentence image. Thereby, a limitation can be placed on editing (e.g., a production source or the like of the sentence image is inevitably described, etc.).

According to the seventh and eighth aspects, a receiver-side apparatus can a production source of sentence data. Therefore, the user of the receiver-side apparatus can be aware of the production source.

According to the ninth aspect, a description which cannot be edited by the user can be added to a sentence image. Thereby, a limitation can be placed on editing (e.g., a production source or the like of the sentence image is inevitably described, etc.). For example, when sentence data for which a copyright display is required is transmitted, the display is prevented from being erased.

According to the tenth aspect, a sentence image in the form of image data is used to edit the sentence image, thereby making it possible to easily edit in a manner which the user desires.

According to the eleventh aspect, a variety of editing can be performed with respect to a sentence image (e.g., combining another image with the sentence image).

According to the twelfth aspect, the user can edit a sentence image using a hand-written input, thereby making it possible to image processing, such as adding a cross mark, a horizontal line (through a text or the like), and the like. In addition, the user can erase a sentence image using a hand-written input.

According to the thirteenth aspect, a variety of editing can be performed with respect to a sentence image by a text input. In addition, even when data in the form of image data is transmitted and received, added text data is converted into image data and can be easily handled.

According to the fourteenth aspect, a character in the form of text data recognized from a user's hand-written drawing can be added to a sentence image.

According to the fifteenth aspect, a character in the form of text data can be added to an arbitrary position of a sentence image by an operation (e.g., drag) performed with respect to a selected character.

According to the sixteenth aspect, a character in the form of text data added to a sentence image can be deleted.

According to the information processing apparatus and the information processing system of the present invention, an effect similar to that of the storage medium storing the program can be obtained.

These and other features, aspects and advantages of the present invention will become more apparent from the following detailed description when taken in conjunction with the accompanying drawings.

BRIEF DESCRIPTION OF THE DRAWINGS

FIG. 18 is a subroutine indicating a detailed operation of a text input process in step 57 of FIG. 17;

DETAILED DESCRIPTION

Figure 1:
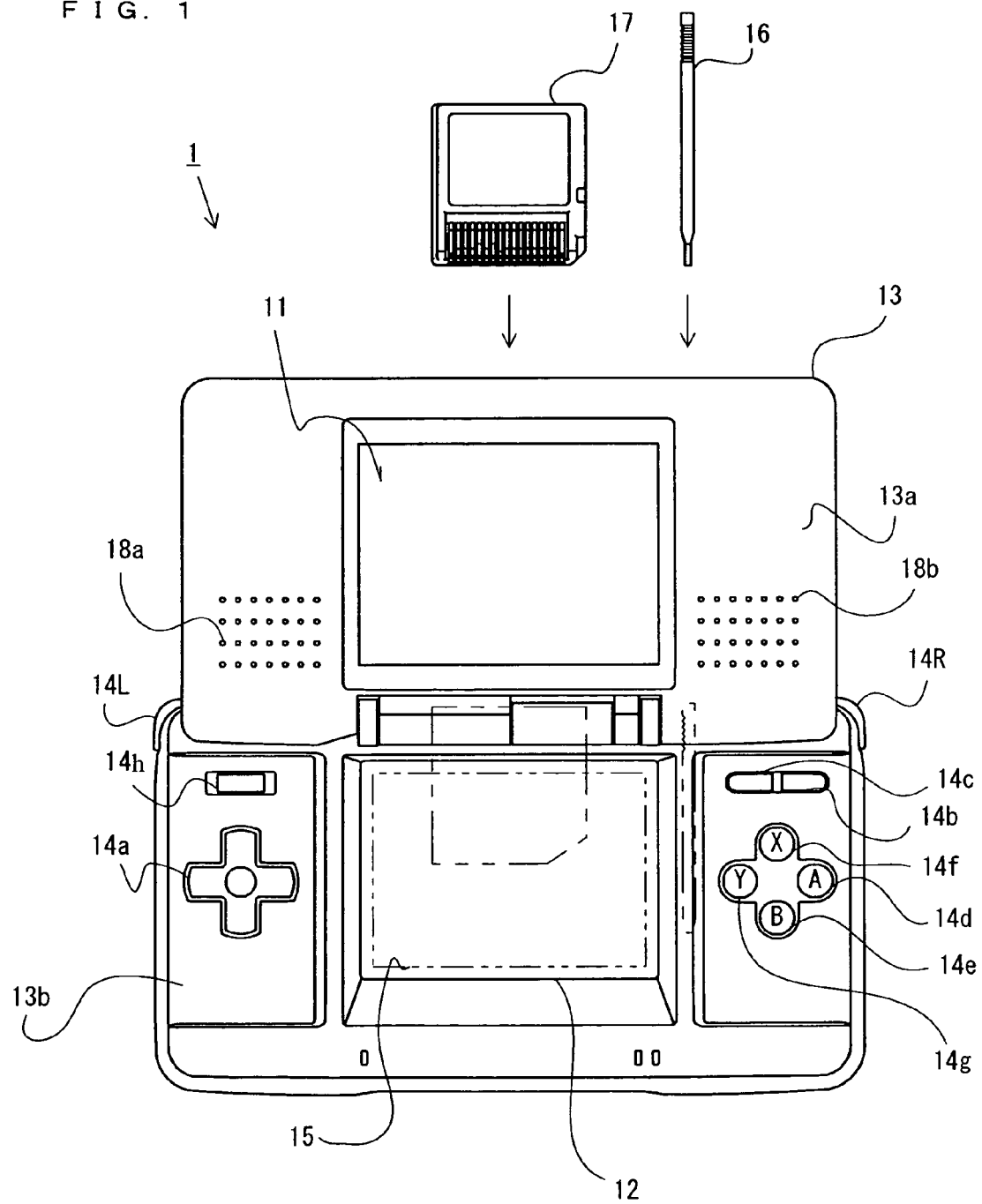
FIG. 1 is a diagram illustrating an external appearance of a game apparatus 1 which executes a program according to the present invention.

An information processing apparatus of executing a program according to an embodiment of the present invention will be described. The program of the present invention can be executed using any computer system capable of displaying on at least one display device. As an example of the information processing apparatus, a game apparatus 1 is used to execute the program in the following description. Note that FIG. 1 is a diagram illustrating an external appearance of the game apparatus 1 which executes the program of the present invention. Here, a hand-held game apparatus is illustrated as an example of the game apparatus 1.

In FIG. 1, the game apparatus 1 includes a first LCD (liquid crystal display device) 11 and a second LCD 12. A housing 13 is composed of an upper housing 13a and a lower housing 13b. The first LCD 11 is housed in the upper housing 13a, while the second LCD 12 is housed in the lower housing 13b. The first LCD 11 and the second LCD 12 each have a resolution of 256 dots×192 dots. Although an LCD is used as a display device in this embodiment, any other display devices, such as a display device employing EL (Electro Luminescence) and the like, can be used. Also, the display device can have any resolution.

Sound holes 18a and 18b through which sound is emitted from a pair of loudspeakers (30a and 30b in FIG. 2) described below to the outside are formed on the upper housing 13a.

On the lower housing 13b, a cross switch 14a, a start switch 14b, a select switch 14c, an A-button 14d, a B-button 14e, an X-button 14f, a Y-button 14g, a power switch 14h, an L-button 14L, and an R-button 14R are provided as input devices. As an additional input device, a touch panel 15 is attached onto a screen of the second LCD 12. In addition, the lower housing 13b is provided with slots into which a memory card 17 and a stick 16 are inserted.

The touch panel 15 may be of any type including, for example, a resistance film type, an optical (infrared) type, an electrostatic capacitance coupling type, and the like. The touch panel 15 has an exemplary pointing device having a function of outputting coordinate data corresponding to a touch position when the stick 16 touches a surface of the touch panel 15. Although it is hereinafter assumed that a player operates the touch panel 15 using the stick 16, a pen (stylus pen) or a finger can be used instead of the stick 16 so as to operate the touch panel 15. In this embodiment, the touch panel 15 has the same resolution (detection precision) as that of the second LCD 12, i.e., 256 dots×192 dots. Note that the touch panel 15 and the second LCD 12 do not need to have the same resolution.

The memory card 17 is a storage medium which stores a program and electronic book data which is digital data of sentences of an electronic dictionary or the like, and is detachably inserted into the slot provided in the lower housing 13b. Note that the electronic dictionary will be described as an example.

Next, an internal structure of the game apparatus 1 will be described with reference to FIG. 2. Note that FIG. 2 is a block diagram illustrating the internal structure of the game apparatus 1.

Figure 2:
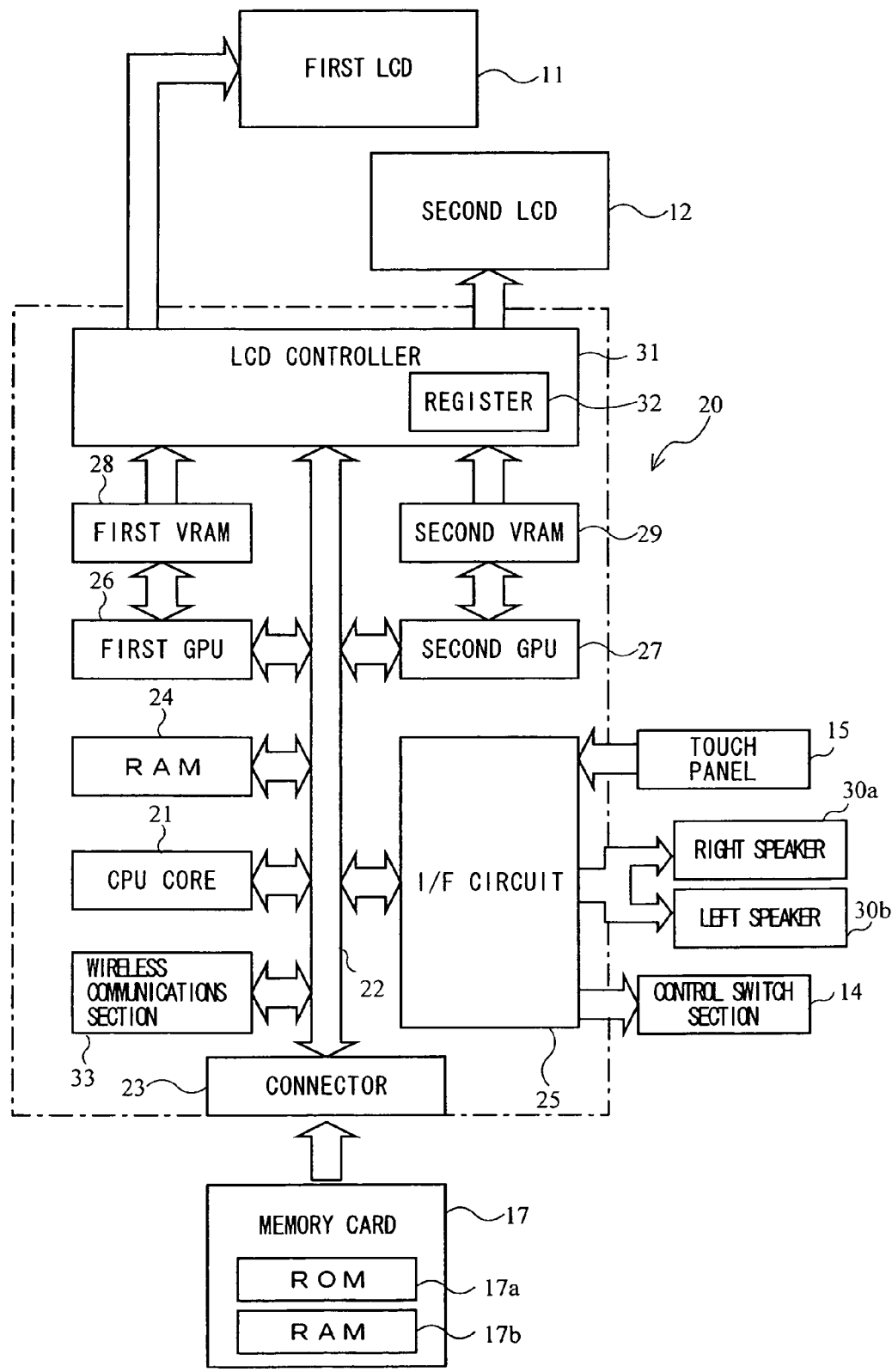
FIG. 2 is a block diagram illustrating an internal structure of the game apparatus 1 of FIG. 1.

In FIG. 2, a CPU core 21 is provided on an electronic circuit board 20 which is housed in the housing 13. A connector 23, an input/output interface circuit (denoted as I/F circuit in FIG. 2) 25, a first GPU (Graphics Processing Unit) 26, a second GPU 27, a RAM 24, an LCD controller 31, and a wireless communications section 33 are connected via a bus 22 to the CPU core 21. The memory card 17 is detachably connected to the connector 23. The memory card 17 comprises a ROM 17a which stores a game program and electronic book data, and a RAM 17b which stores rewritable backup data. The game program stored in the ROM 17a of the memory card 17 is loaded into the RAM 24, and the game program loaded in the RAM 24 is executed by the CPU core 21. In addition to the game program, the RAM 24 stores the electronic dictionary data, temporary data obtained by the CPU core 21 executing the game program, data for generating an image retrieved from the electronic dictionary, and the like. The touch panel 15, the right loudspeaker 30a, the left loudspeaker 30b, and an operation switch section 14 composed of the cross switch 14a, the A-button 14d, and the like of FIG. 1, are connected to the I/F circuit 25. The right loudspeaker 30a and the left loudspeaker 30b are provided inside under the sound holes 18a and 18b, respectively.

A first VRAM (Video RAM) 28 is connected to the first GPU 26, and a second VRAM 29 is connected to the second GPU 27. The first GPU 26 generates a retrieved word image based on text data for displaying a word retrieved from the electronic dictionary, the data being stored in the RAM 24, and draws the word image into the first VRAM 28, in accordance with a command from the CPU core 21. Similarly, the second GPU 27 generates images indicating an edition/transmission area, a text input area, various operation buttons, and the like, and draws the images into the second VRAM 29, in accordance with a command from the CPU core 21. The first VRAM 28 and the second VRAM 29 are connected to the LCD controller 31.

The LCD controller 31 includes a register 32. The register 32 stores a value of 0 or 1 in accordance with a command from the CPU core 21. When the value of the register 32 is 0, the LCD controller 31 outputs the retrieved word image drawn in the first VRAM 28 to the first LCD 11, and outputs the images indicating the edition/transmission area, the text input area, the various operation buttons, and the like, drawn in the second VRAM 29 to the second LCD 12.

The wireless communications section 33 has a function of transmitting/receiving data used in a game process, transmission image data described below, and the like, to/from the wireless communications sections 33 of other game apparatuses (e.g., a wireless communications function in compliance with wireless LAN standards IEEE802.11). The wireless communications section 33 outputs received data to the CPU core 21. The wireless communications section 33 also transmits data designated by the CPU core 21 to other game apparatuses.

Note that the program of the present invention can be executed using any computer system capable of displaying on at least one display device as described above, and the game program of the present invention is not only supplied to a computer system via an external storage medium, such as the memory card 17 or the like, but also may be supplied to the computer system via a wired or wireless communications line. Alternatively, the game program of the present invention may be previously stored in a non-volatile storage device of the computer system. An information storage medium storing the program and the electronic book data is not limited to the non-volatile storage device, and may be a CD-ROM, a DVD, and other similar optical disc storage media.

Figure 3:
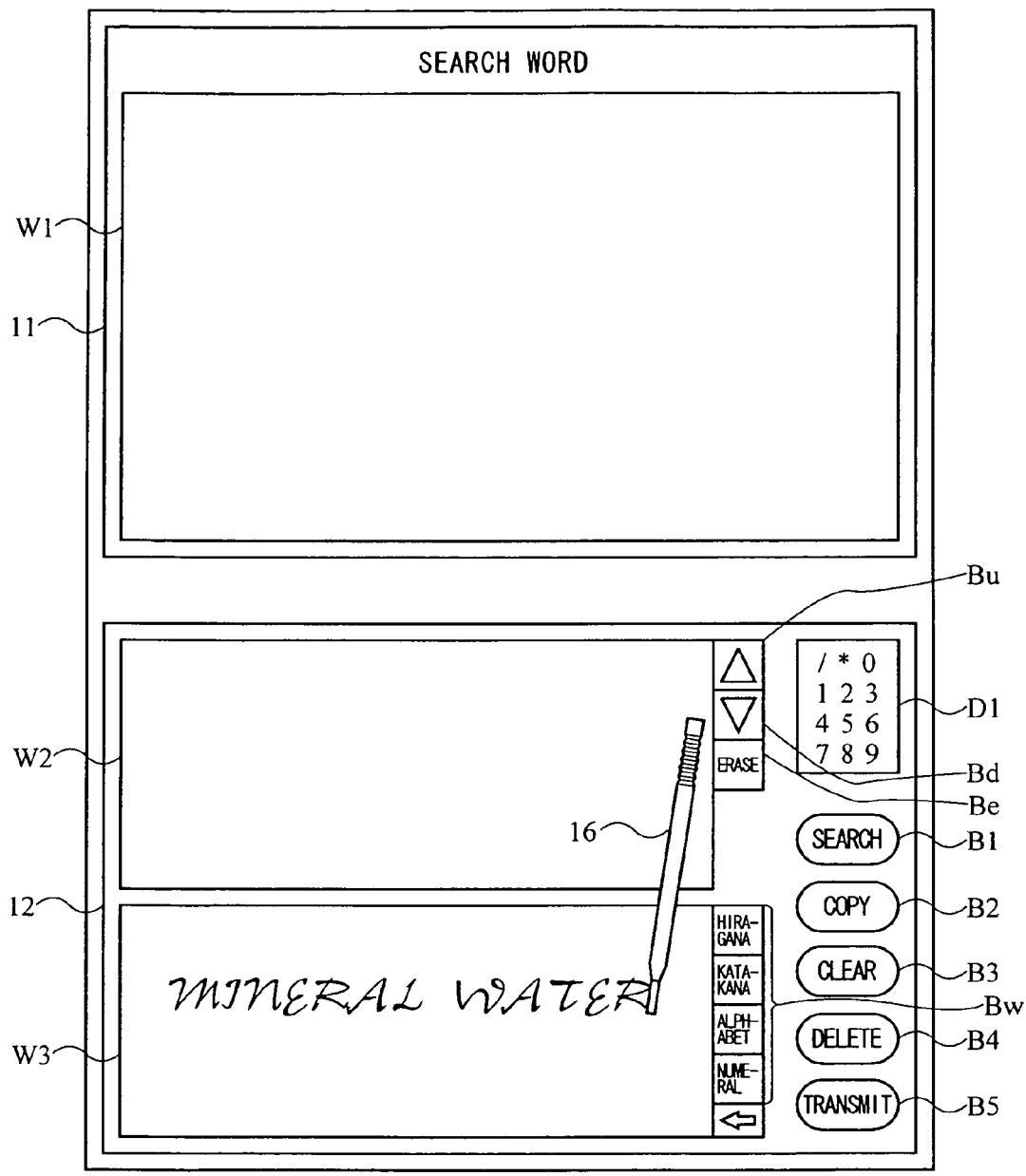
FIG. 3 is a diagram illustrating exemplary screen displays of a electronic dictionary displayed on a first LCD 11 and a second LCD.
Figure 4:
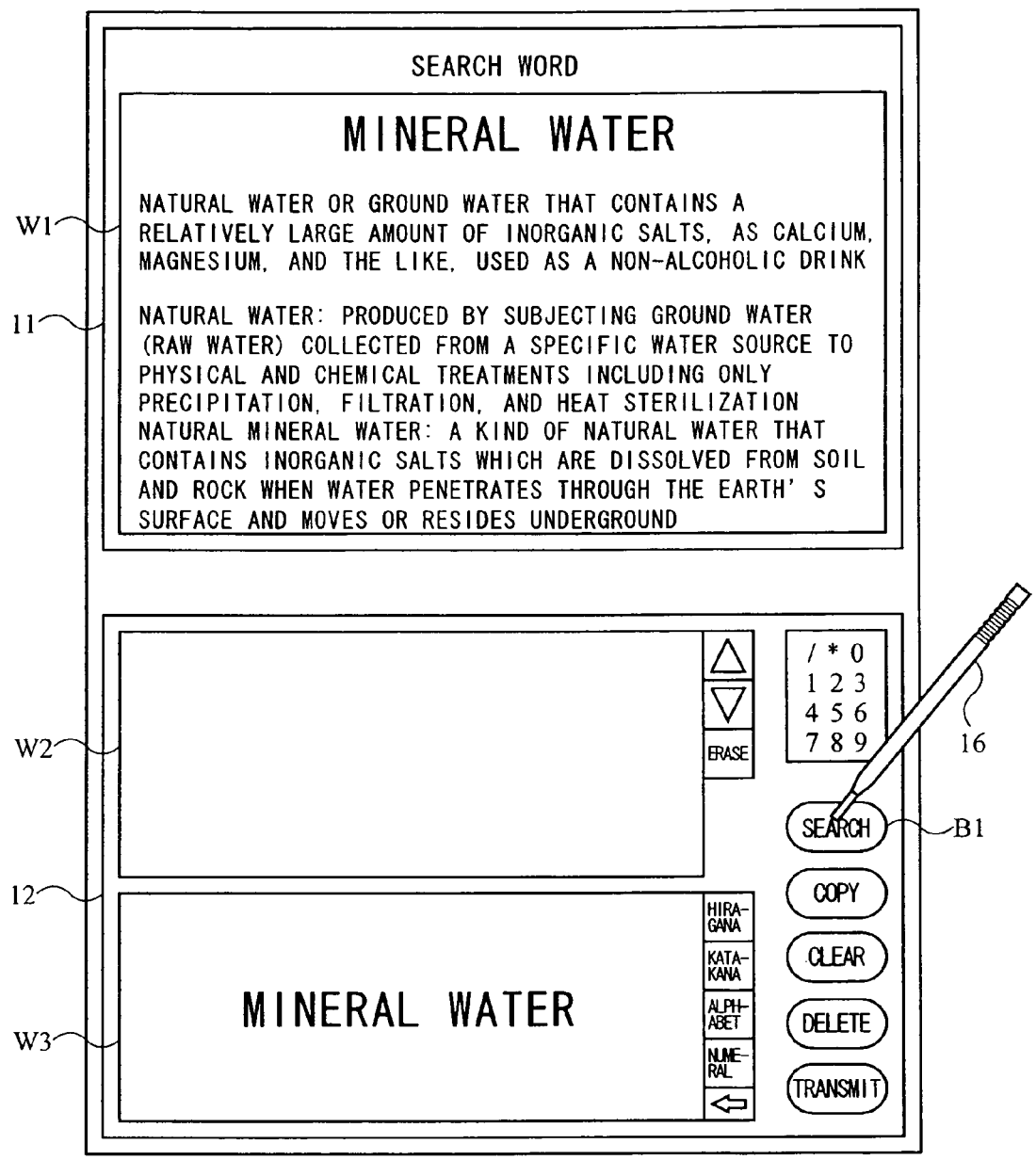
FIG. 4 is a diagram illustrating exemplary screen displays displayed on the first LCD 11 and the second LCD 12 when a touch operation is performed with respect to a search button B1 of FIG. 3.
Figure 5:
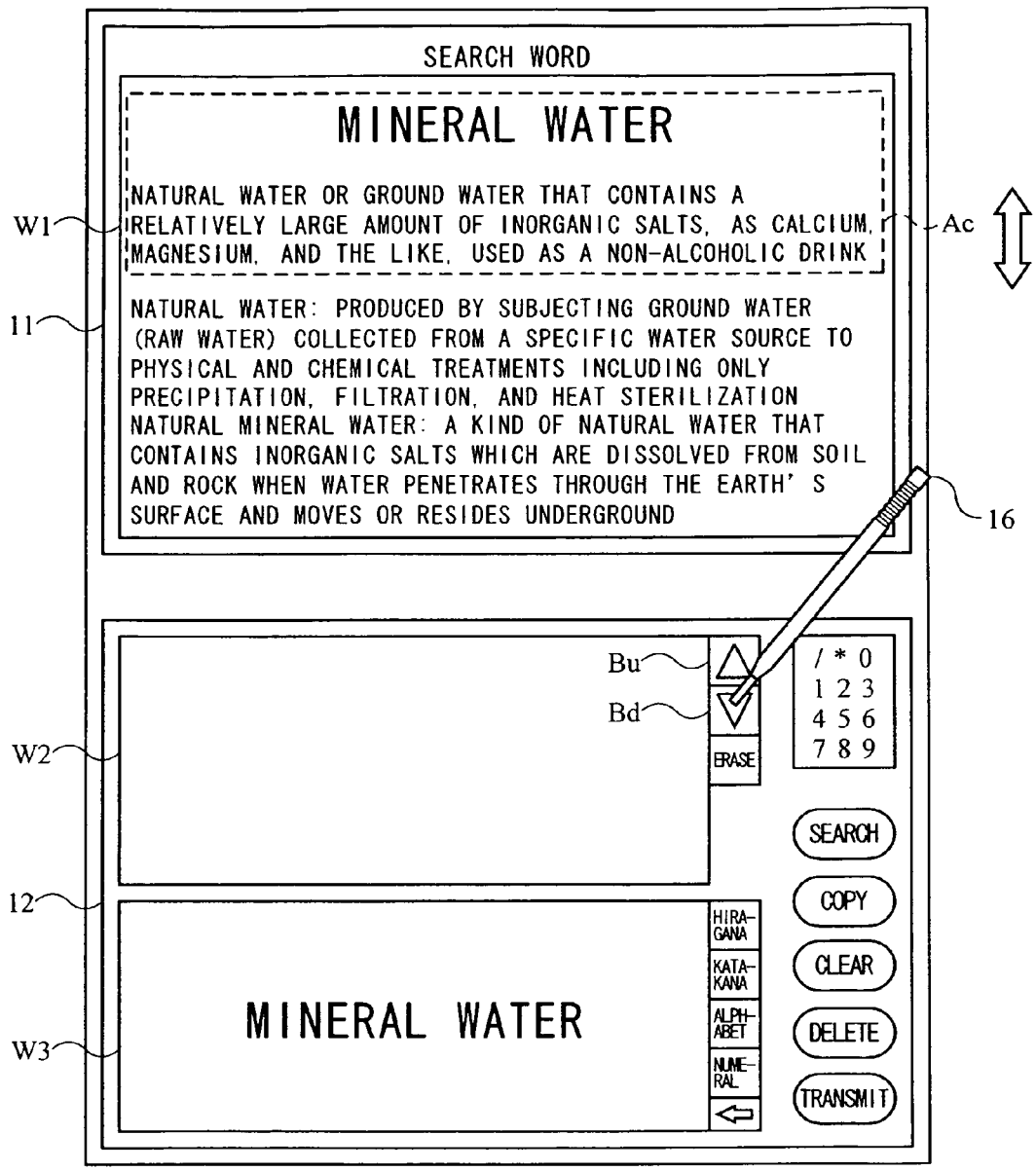
FIG. 5 is a diagram illustrating exemplary screen displays displayed on the first LCD 11 and the second LCD 12 when a touch operation is performed with respect to scroll buttons Bu and Bd of FIG. 3.
Figure 6:
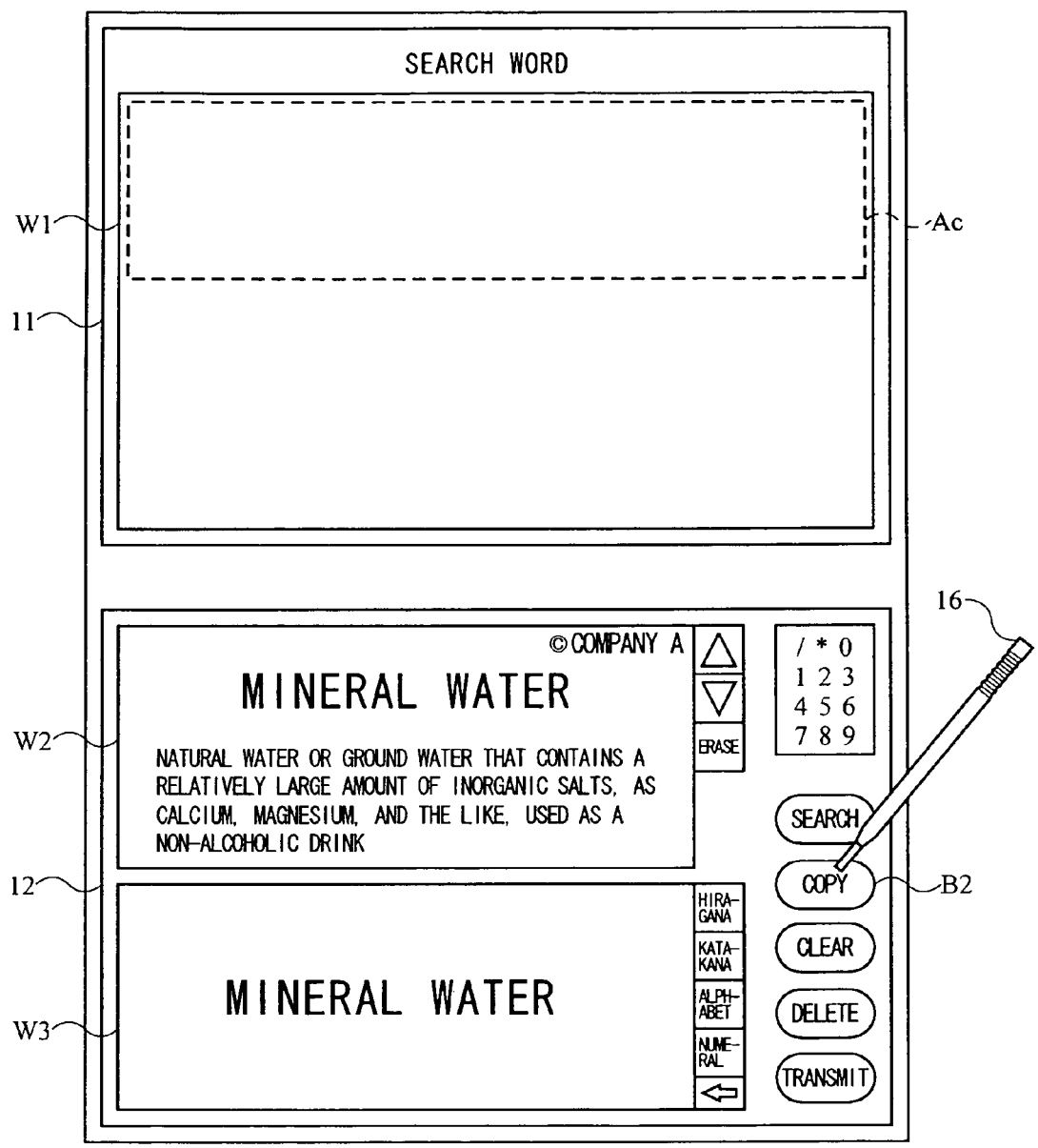
FIG. 6 is a diagram illustrating exemplary screen displays displayed on the first LCD 11 and the second LCD 12 when a touch operation is performed with respect to a copy button B2 of FIG. 3.
Figure 7:
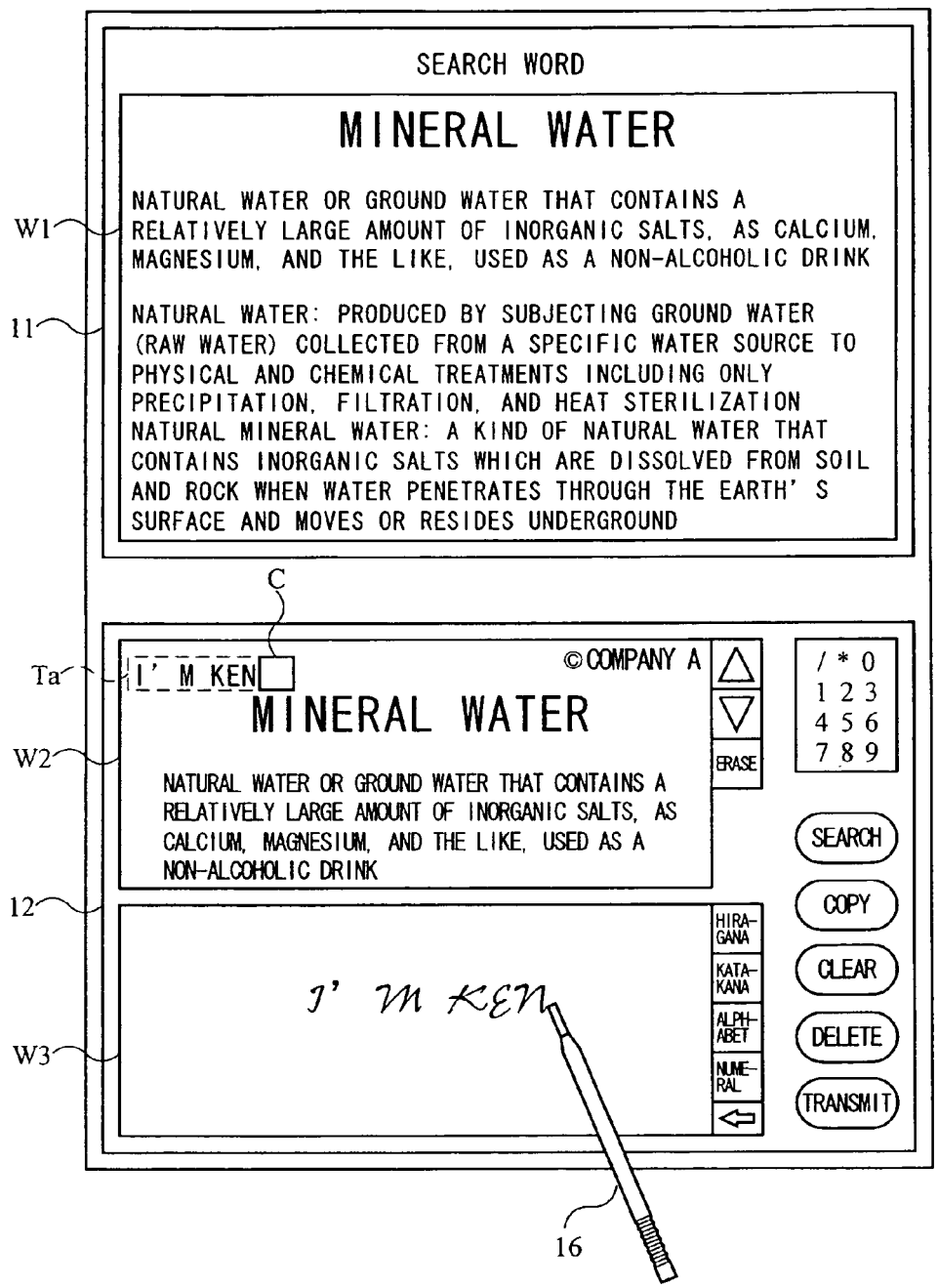
FIG. 7 is a diagram illustrating exemplary screen displays displayed on the first LCD 11 and the second LCD 12 when a text input area W3 is used to add text data to an editing/transmission area W2 of FIG. 3.
Figure 8:
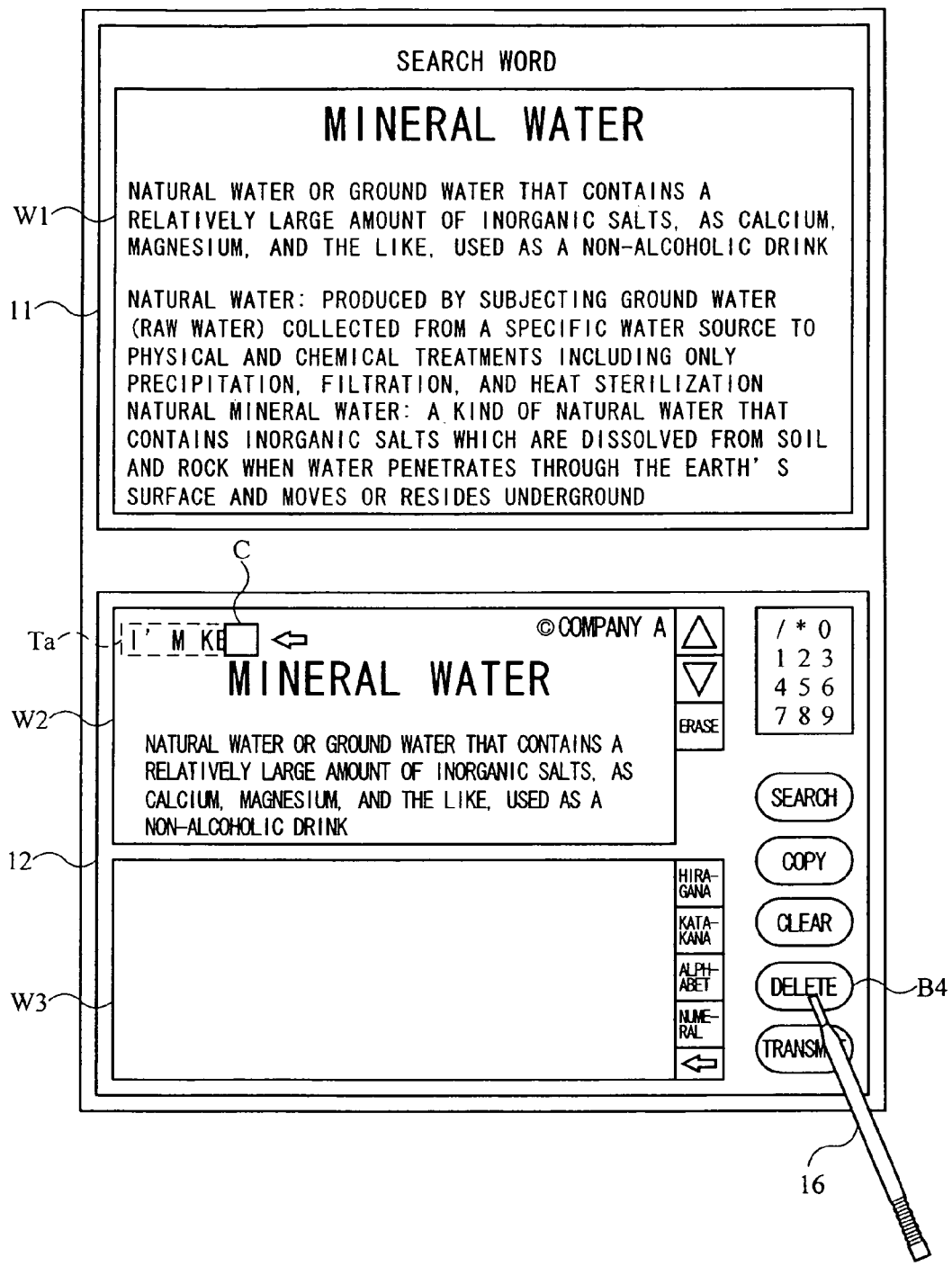
FIG. 8 is a diagram illustrating exemplary screen displays displayed on the first LCD 11 and the second LCD 12 when a touch operation is performed with respect to a delete button B4 of FIG. 3.
Figure 9:
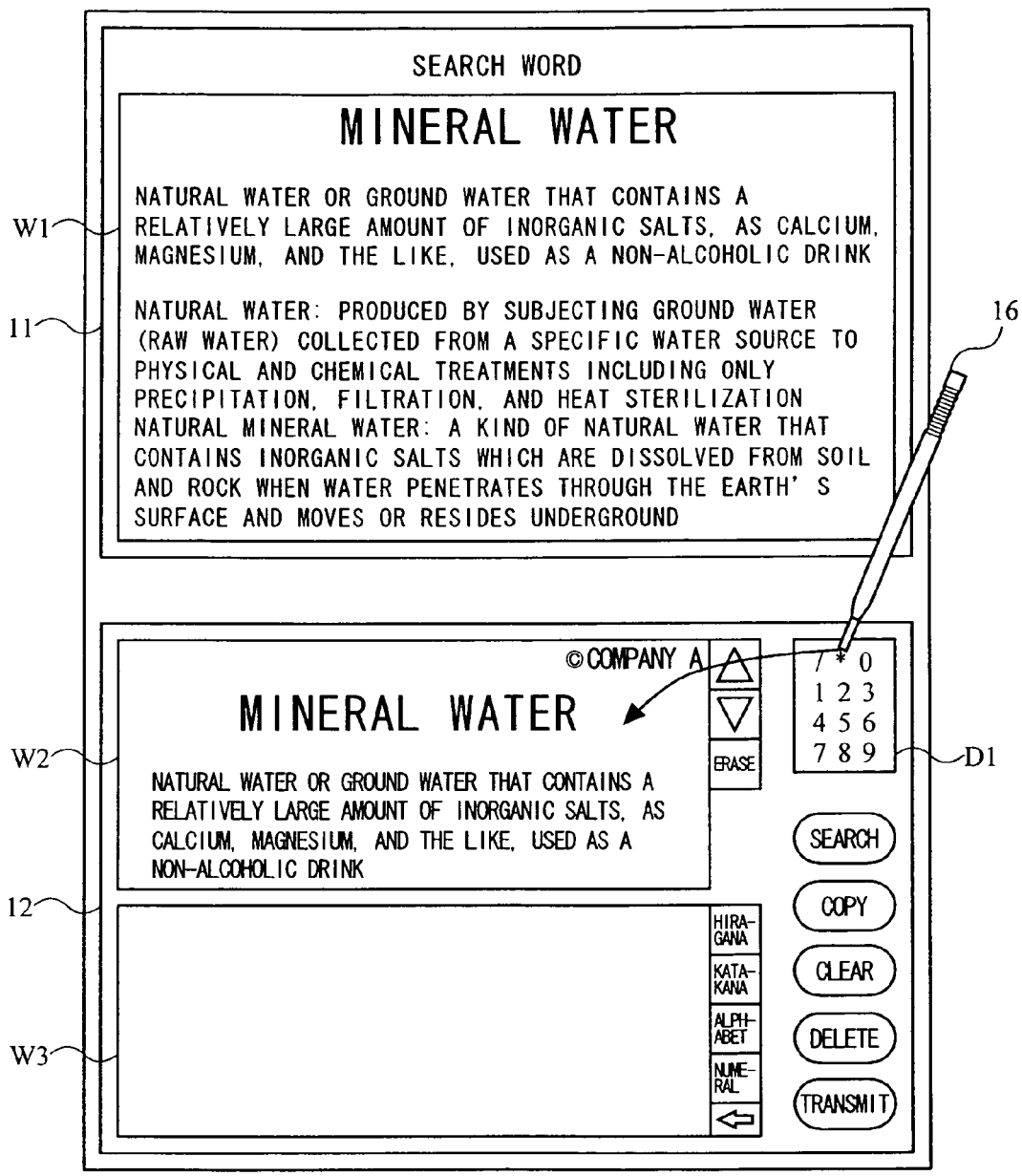
FIG. 9 is a diagram illustrating exemplary screen displays displayed on the first LCD 11 and the second LCD 12 when a touch operation is performed with respect to a text select button D1 of FIG. 3.
Figure 10:
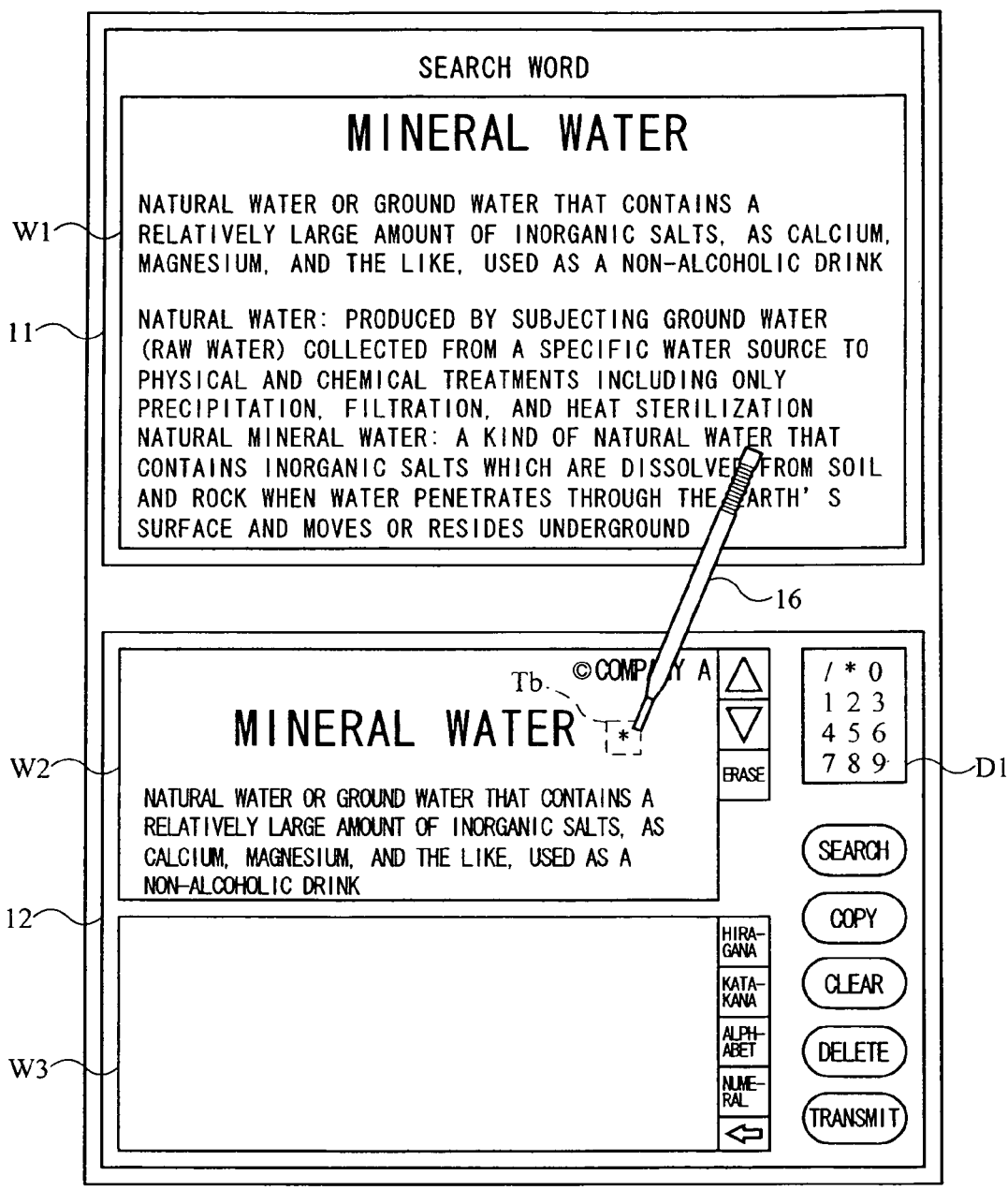
FIG. 10 is a diagram illustrating exemplary screen displays displayed on the first LCD 11 and the second LCD 12 when text data is selected and dragged by a touch operation as illustrated in FIG. 9.
Figure 11:
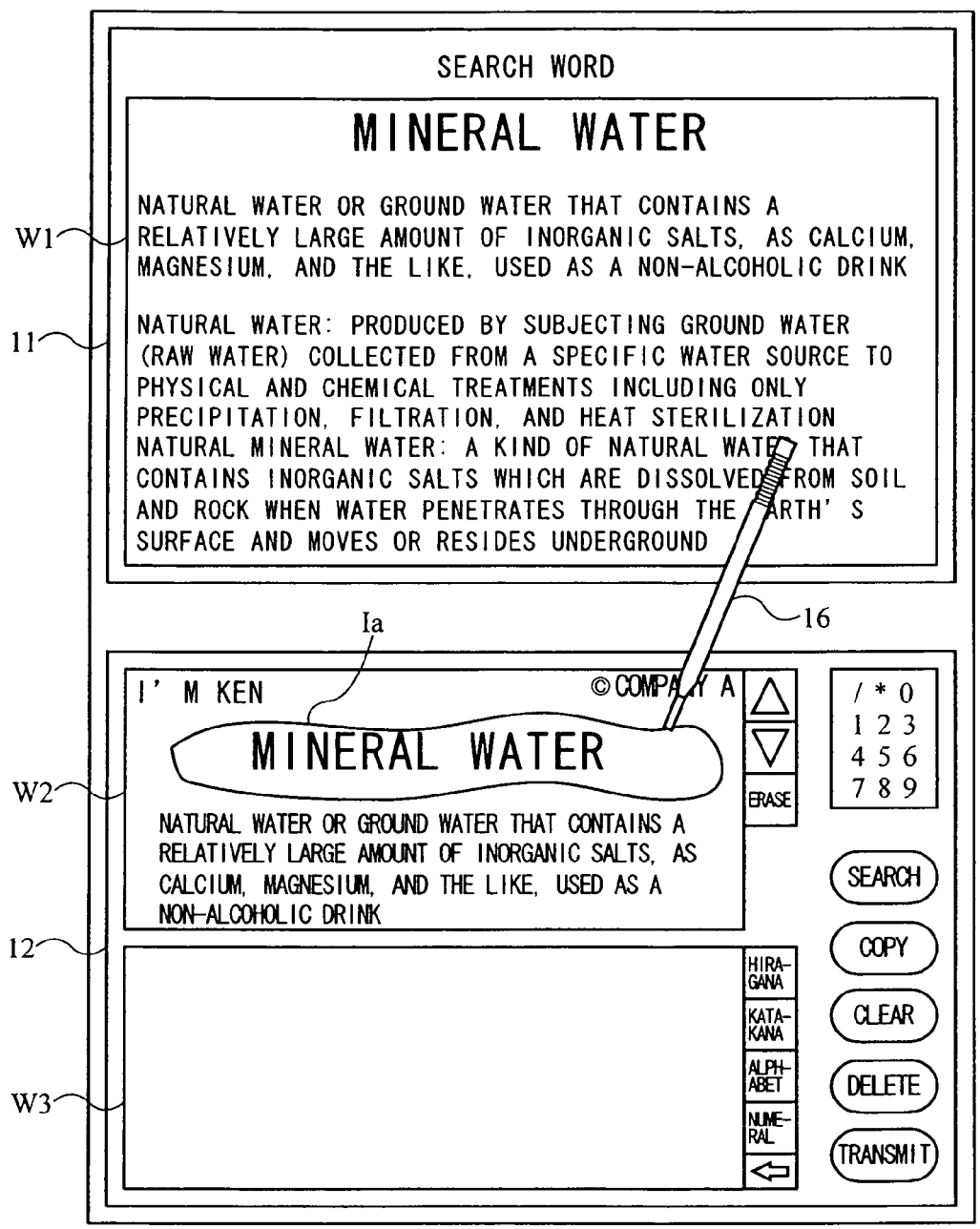
FIG. 11 is a diagram illustrating exemplary screen displays displayed on the first LCD 11 and the second LCD 12 when drawing is performed by a touch operation in an editing/transmission area W2 of FIG. 3.
Figure 12:
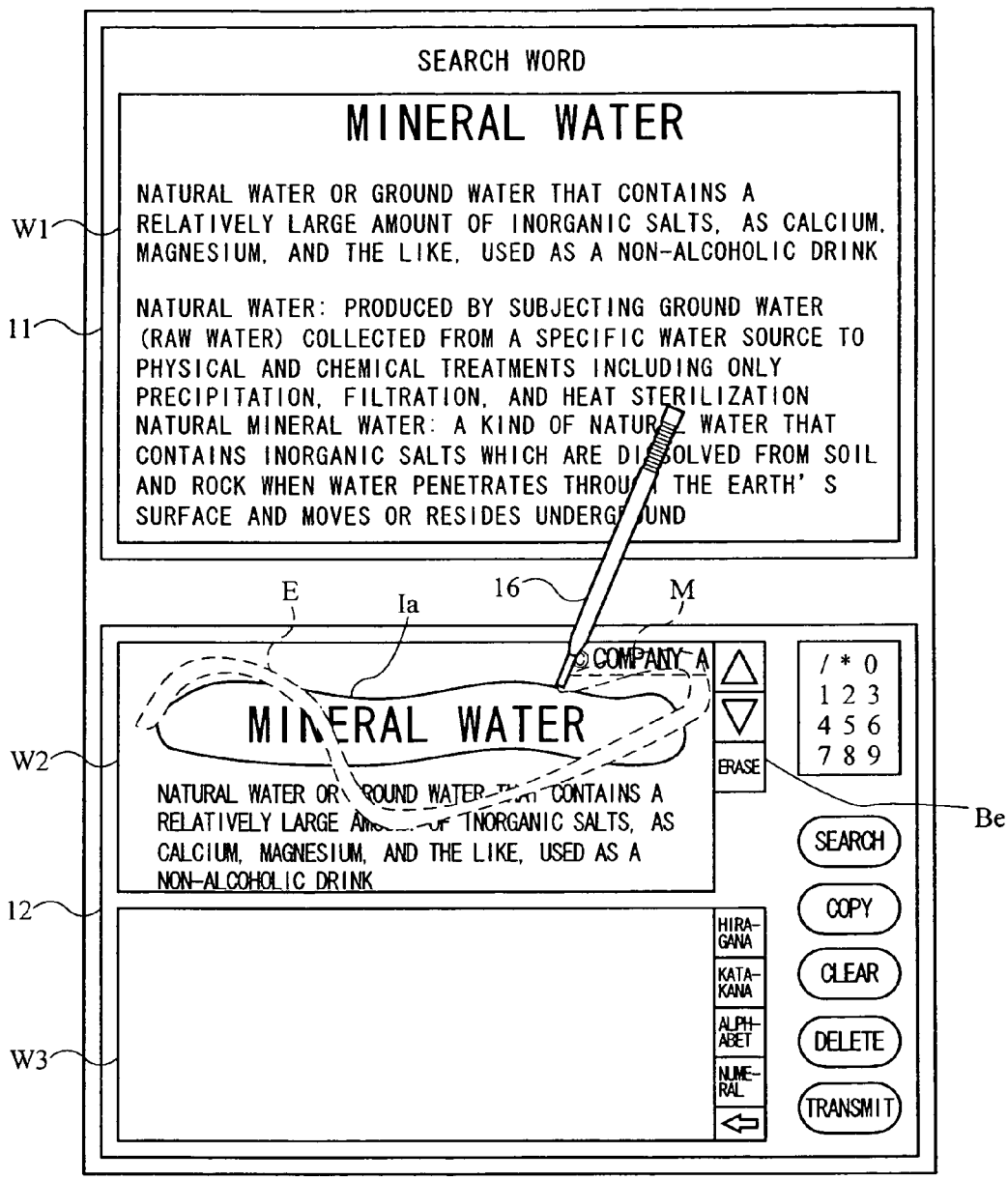
FIG. 12 is a diagram illustrating exemplary screen displays displayed on the first LCD 11 and the second LCD 12 when a portion of an image is erased by a touch operation in the editing/transmission area W2 of FIG. 3.
Figure 13:
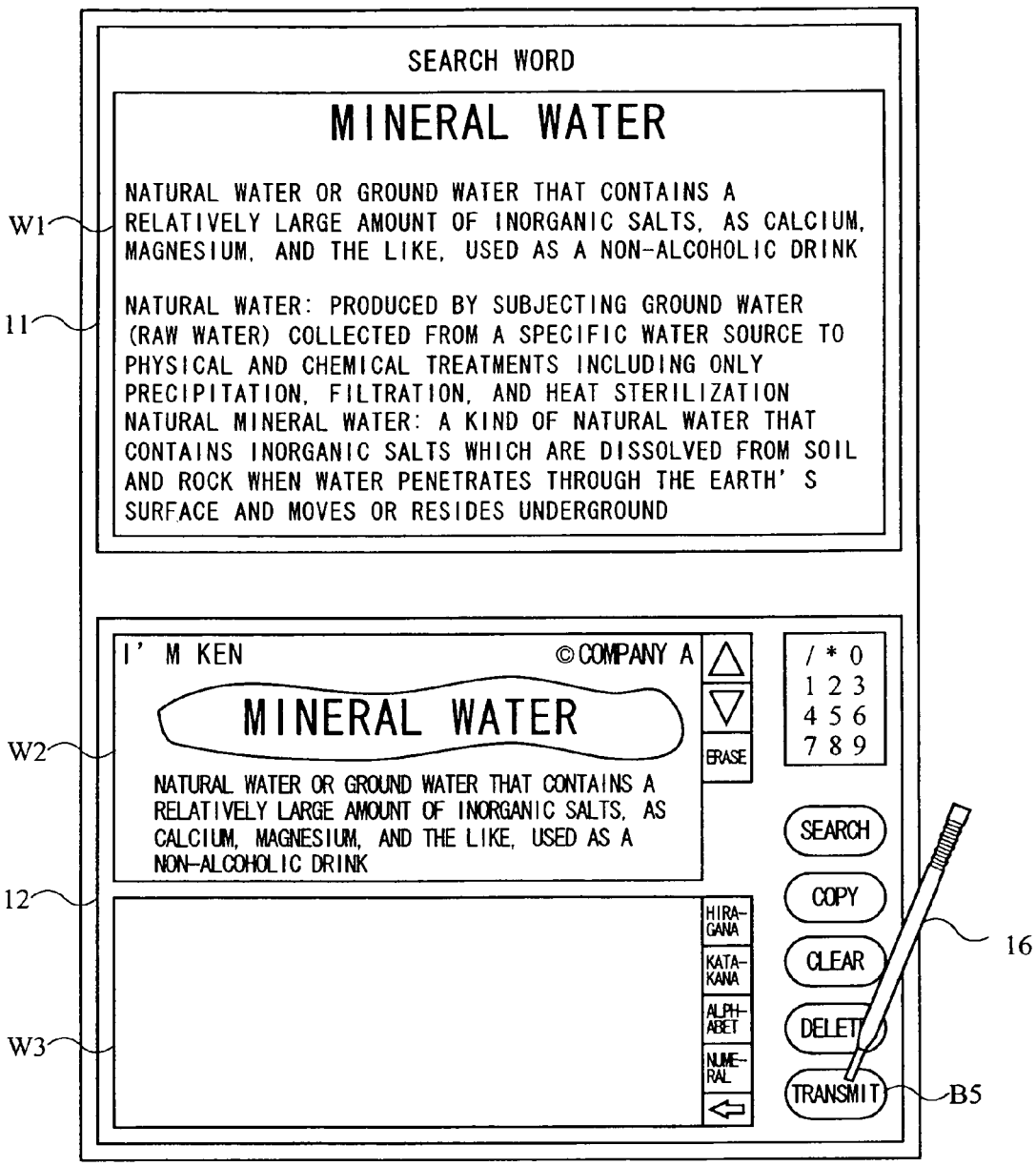
FIG. 13 is a diagram illustrating exemplary screen displays displayed on the first LCD 11 and the second LCD 12 of the game apparatus 1 when a touch operation is performed with respect to a transmit button B5 of FIG. 3.
Figure 14:
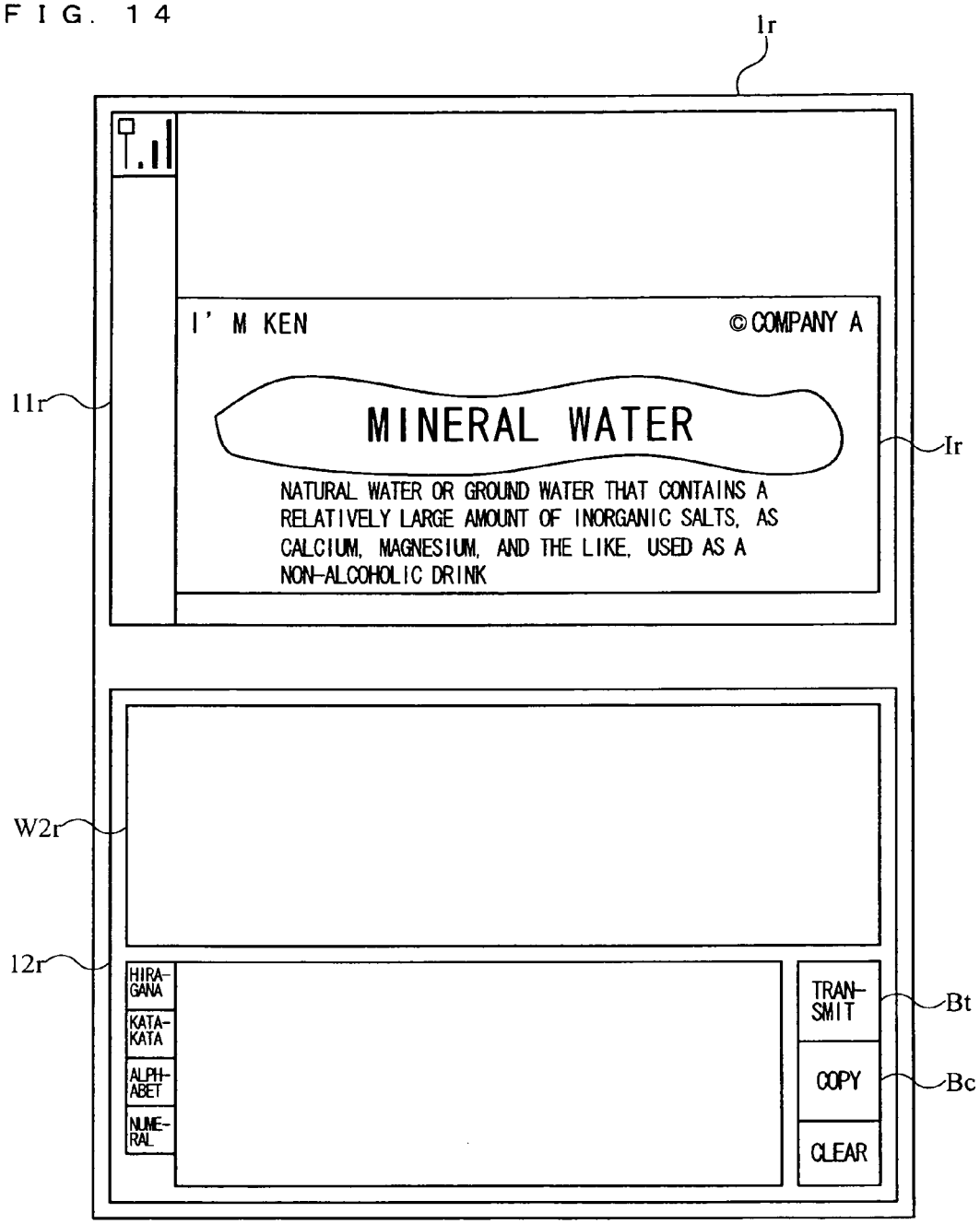
FIG. 14 is a diagram illustrating exemplary screen displays displayed on a first LCD 11r and a second LCD 12r of a game apparatus 1r which has received data (FIG. 13) transmitted from the game apparatus 1.
Figure 15:
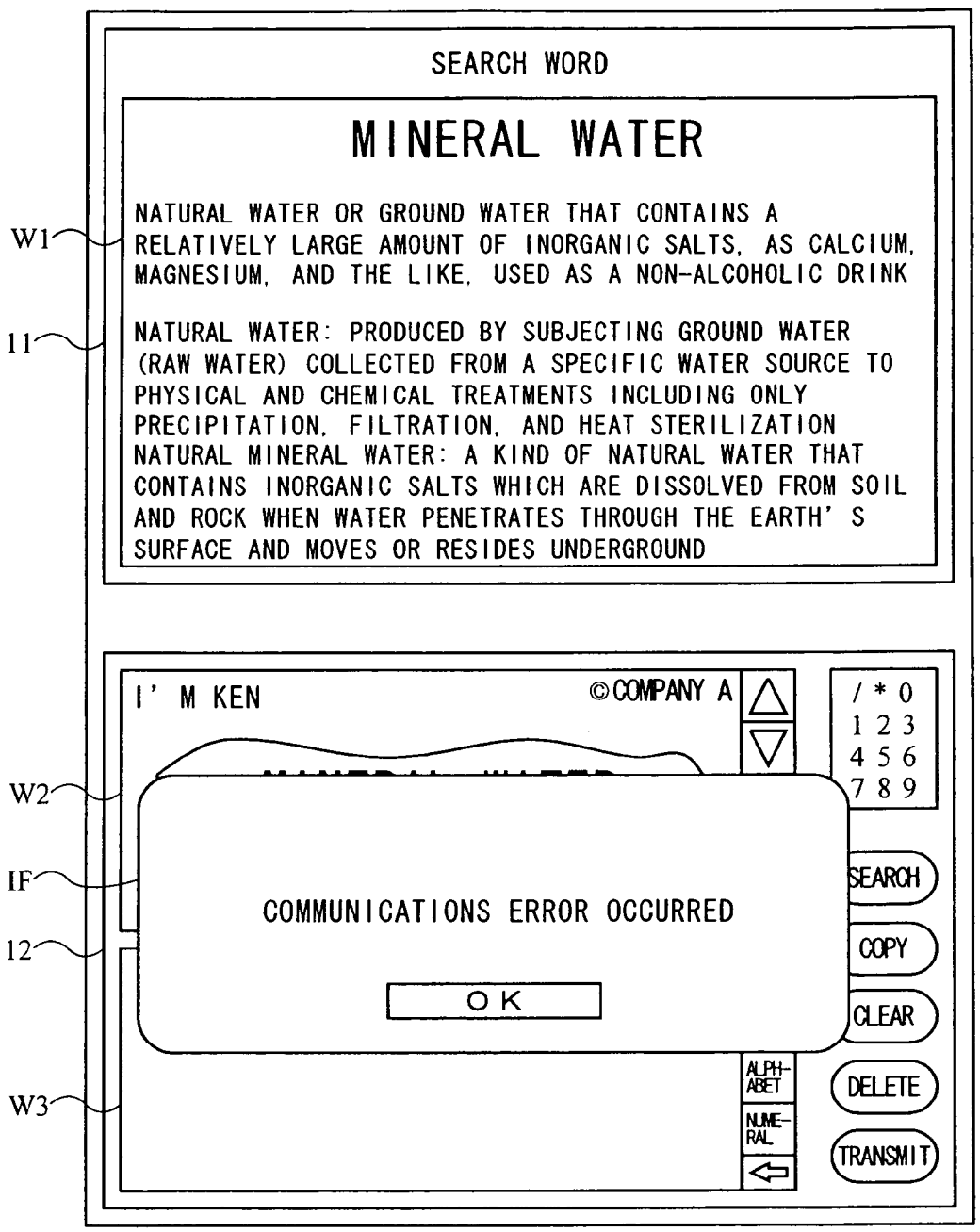
FIG. 15 is a diagram illustrating exemplary screen displays displayed on the first LCD 11 and the second LCD 12 of FIG. 3 when communications error occurs.
Figure 16:
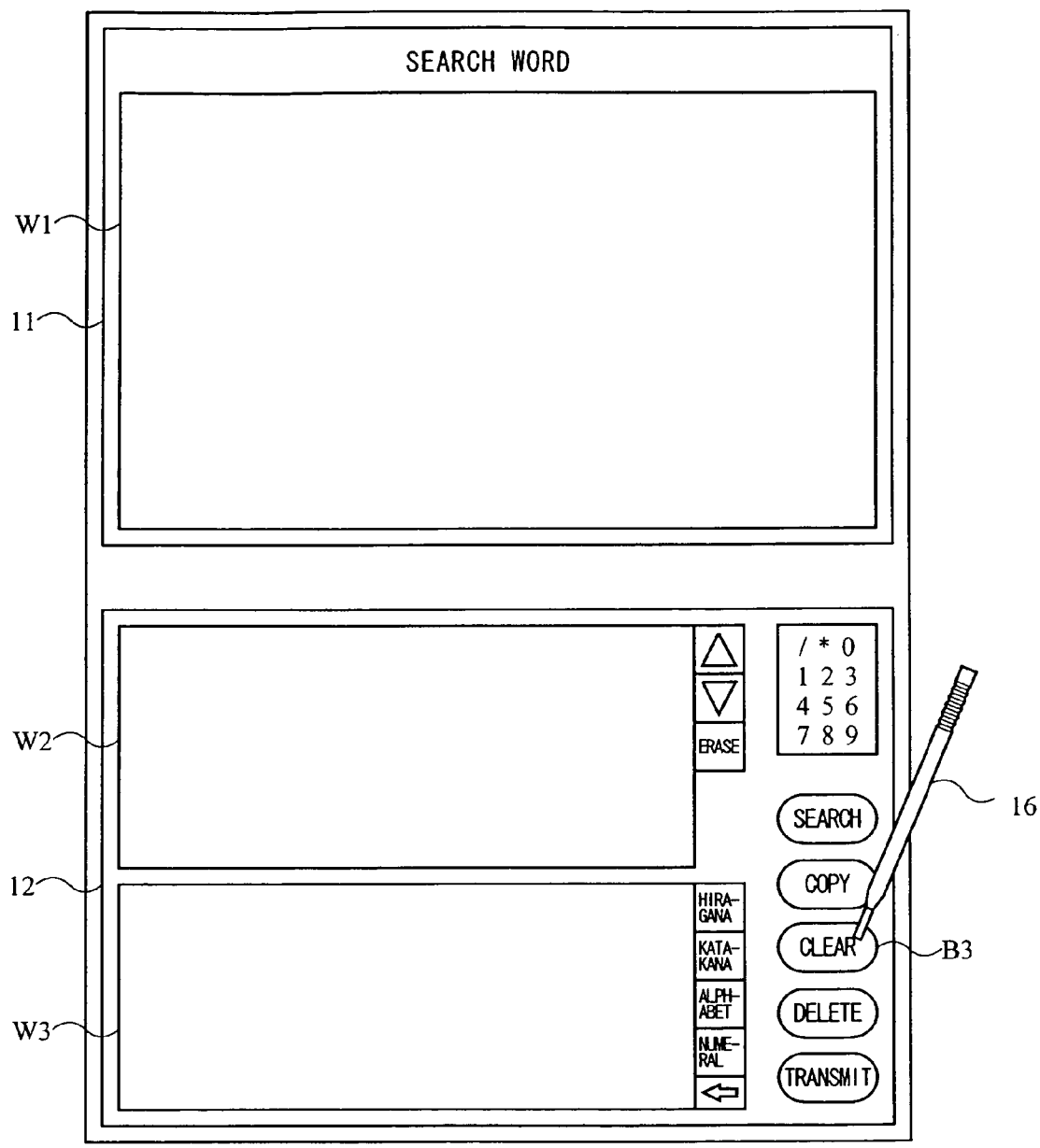
FIG. 16 is a diagram illustrating exemplary screen displays displayed on the first LCD 11 and the second LCD 12 when a touch operation is performed with respect to a clear button B3 of FIG. 3.

Next, before describing a specific processing operation of the program executed by the game apparatus 1, display forms presented on the first LCD 11 and the second LCD 12 by the processing operation will be described with reference to FIGS. 3 to 16. As a specific example, an exemplary display form of an electronic dictionary which is digital data of a dictionary stored in an electronic medium and is viewed on the game apparatus 1, will be described. In this case, data stored in the memory card 17 is digital data of the dictionary (electronic dictionary data) including headword data and sentence data corresponding thereto. Note that FIG. 3 is a diagram illustrating exemplary screen displays of the electronic dictionary displayed on the first LCD 11 and the second LCD 12. FIG. 4 is a diagram illustrating exemplary screen displays displayed on the first LCD 11 and the second LCD 12 when a touch operation is performed with respect to a search button B1. FIG. 5 is a diagram illustrating exemplary screen displays displayed on the first LCD 11 and the second LCD 12 when a touch operation is performed with respect to scroll buttons Bu and Bd. FIG. 6 is a diagram illustrating exemplary screen displays displayed on the first LCD 11 and the second LCD 12 when a touch operation is performed with respect to a copy button B2. FIG. 7 is a diagram illustrating exemplary screen displays displayed on the first LCD 11 and the second LCD 12 when a text input area W3 is used to add text data to an editing/transmission area W2. FIG. 8 is a diagram illustrating exemplary screen displays displayed on the first LCD 11 and the second LCD 12 when a touch operation is performed with respect to a delete button B4. FIG. 9 is a diagram illustrating exemplary screen displays displayed on the first LCD 11 and the second LCD 12 when a touch operation is performed with respect to a text select button D1. FIG. 10 is a diagram illustrating exemplary screen displays displayed on the first LCD 11 and the second LCD 12 when text data is selected and dragged by a touch operation. FIG. 11 is a diagram illustrating exemplary screen displays displayed on the first LCD 11 and the second LCD 12 when drawing is performed by a touch operation in the editing/transmission area W2. FIG. 12 is a diagram illustrating exemplary screen displays displayed on the first LCD 11 and the second LCD 12 when a portion of an image is erased by a touch operation in the editing/transmission area W2. FIG. 13 is a diagram illustrating exemplary screen displays displayed on the first LCD 11 and the second LCD 12 of the game apparatus 1 (transmission source) when a touch operation is performed with respect to a transmit button B5. FIG. 14 is a diagram illustrating exemplary screen displays displayed on a first LCD 11r and a second LCD 12r of a game apparatus 1r which has received data (FIG. 13) transmitted from the game apparatus 1. FIG. 15 is a diagram illustrating exemplary screen displays displayed on the first LCD 11 and the second LCD 12 when communications error occurs. FIG. 16 is a diagram illustrating exemplary screen displays displayed on the first LCD 11 and the second LCD 12 when a touch operation is performed with respect to a clear button B3.

In FIG. 3, a search word display area W1 and the like are provided and displayed on the first LCD 11 of the game apparatus 1. The editing/transmission area W2, the text input area W3, the search button B1, the copy button B2, the clear button B3, the delete button B4, the transmit button B5, the up scroll button Bu, the down scroll button Bd, an erase button Be, character type select buttons Bw, the text select button D1, and the like are provided and displayed on the second LCD 12 of the game apparatus 1. Since a surface of the second LCD 12 is covered with the touch panel 15, by performing a touch operation with respect to each area or each button displayed on the second LCD 12, an operation can be performed in accordance with a display designated by the touch operation. Hereinafter, exemplary displays which are provided in accordance with these operations will be described.

For example, when the user performs a touch operation with respect to the touch panel 15 in the text input area W3, a character(s) corresponding to the touch operation is recognized. When a character is input to the text input area W3, initially, a touch operation is performed with respect to any of the character type select buttons Bw by the user to select the type of a character to be inputted. Specifically, as illustrated in FIG. 3, the character type select buttons Bw include the following character types: "hiragana", "katakana", "alphabet", and "numeral". A character type is determined by the user performing an operation of instantaneously touching and releasing the touch panel 15 on any of the buttons (hereinafter referred to as a tap operation).

Thereafter, when the user performs a touch operation with respect to the touch panel 15 so that a character which the user wants to input is drawn in the text input area W3, the game apparatus 1 displays an image corresponding to the touch input in the text input area W3. In the example of FIG. 3, the user inputs hand-written characters "MINERAL WATER" using a stick 16. Thereafter, the game apparatus 1 compares the touch input with an input text data list Da4 (see FIG. 23) to recognize characters "MINERAL WATER" whose shape is closest to that of the hand-written characters.

In FIG. 4, after the characters drawn in the text input area W3 are recognized, when the user performs a tap operation with respect to the search button B1, a retrieved word description corresponding to the input characters displayed as character information in the search word display area W1 of the first LCD 11. In the example of FIG. 4, corresponding to the input characters "MINERAL WATER", sentence data indicating a meaning, a synonym, or the like of the word is retrieved from electronic dictionary data (a search word text data list Da3; see FIG. 23), and at least a portion of the sentence data is displayed in the search word display area W1. For example, the sentence data is stored in the form of text data, and character information corresponding to the retrieved text data is displayed in the search word display area W1.

In FIG. 5, a copy target area Ac is set in the search word display area W1, and an image indicating an outer frame of the copy target area Ac is displayed in the search word display area W1. The copy target area Ac can be moved upward or downward (indicated with open arrows in FIG. 5) in the search word display area W1 by performing a touch operation with respect to the up scroll button Bu or the down scroll button Bd displayed on the second LCD 12. Note that, as described below, the copy target area Ac indicates a range of the search word display area W1, sentence data within which is cut out and is copied to the editing/transmission area W2.

In FIG. 6, when the user performs a tap operation with respect to the copy button B2, the sentence data displayed in the copy target area Ac is copied to the editing/transmission area W2. Here, the game apparatus 1 converts the text data (sentence data) displayed in the copy target area Ac into image data, and based on the image data, performs a display in the editing/transmission area W2. In addition to the image data copied from the search word display area W1, a description indicating an information source (e.g., "COMPANY A" in FIG. 6) or the like of the copied sentence data is displayed in a portion of the editing/transmission area W2. The image data copied to the editing/transmission area W2 can be subjected to various types of editing, depending on the operation of the user. Hereinafter, the various editing operations will be described.

In FIG. 7, a cursor C is set and displayed at a predetermined position of the editing/transmission area W2 (e.g., an upper left corner of the area). Thereafter, when the user performs a touch operation with respect to the touch panel 15 so that a character(s) which the user wants to input is drawn in the text input area W3, the game apparatus 1 displays an image corresponding to the touch input in the text input area W3. In the example of FIG. 7, the user inputs characters "I'M KEN" using the stick 16. Thereafter, the game apparatus 1 compares the touch input with the input text data list Da4 to recognize characters whose shape is closest to that of the hand-written characters input by the user. After the characters drawn in the text input area W3 are recognized, input characters Ta thus recognized are displayed at the position of the cursor C in the editing/transmission area W2. In the example of FIG. 7, the characters "I'M KEN" recognized as the input characters Ta are displayed. Here, when displaying the input characters Ta at the position of the cursor C, the game apparatus 1 adds text data indicating the input characters Ta to the image data displayed in the editing/transmission area W2. In other words, image data (the copied sentence data) and text data (the input characters Ta) coexist in data for displaying an image in the editing/transmission area W2. Note that, as appropriate, the text data of the input characters Ta added to the editing/transmission area W2 may be converted into image data, which is in turn combined with other image data.

In FIG. 8, when the user performs a tap operation with respect to the delete button B4, one character of text data which was last added to the editing/transmission area W2 is deleted. For example, in the case where the user has added the input characters Ta to the editing/transmission area W2 as illustrated in FIG. 7, one character of the input characters Ta which is displayed immediately before the cursor C (indicated with an open arrow in FIG. 8) is deleted. In the example of FIG. 8, "N" is deleted from the input characters Ta in accordance with a tap operation performed with respect to the delete button B4, so that the input characters Ta is displayed as "I'M KE". Note that, when input character (s) have been added to the editing/transmission area W2 by the user using another method, one character of the input characters which was last added by the operation is deleted.

In FIGS. 9 and 10, when the user performs a touch operation which selects one character from a group of characters displayed in the text select button D1, a touch operation which drags a touch from the text select button D1 to the editing/transmission area W2 while keeping touching the touch panel 15, and a touch operation which releases off the touch panel 15 in the editing/transmission area W2, the selected character Tb is added at a position where the touch operation is ended. Hereinafter, an operation of first touching the touch panel 15 using the stick 16 or a finger is referred to as "touch on", an operation of releasing the stick 16 or a finger off the touch panel 15 is referred to as "touch off", and a touch operation of dragging the stick 16 or a finger from a touch-on position to a touch-off position is referred to as a "drag operation". For example, as illustrated in FIG. 9, it is assumed that the user selects a character "*" displayed in the text select button D1, drags the stick 16 along an arrow of FIG. 9, and releases the stick 16 off the touch panel 15 in the editing/transmission area W2. In this case, as illustrated in FIG. 10, the character "*" is displayed as the selected character Tb at a position where the stick 16 was released off the touch panel 15. Here, when displaying the selected character Tb, the game apparatus 1 adds text data indicating the selected character Tb to the image data displayed in the editing/transmission area W2. Note that, since the selected character Tb is text data as is the input characters Ta, one character which was last added can be deleted by a tap operation on the delete button B4 (see FIG. 8). In addition, as appropriate, the text data of the selected character Tb added in the editing/transmission area W2 may be converted into image data and may be combined with other image data.

In FIG. 11, when the user performs a touch operation with respect to the touch panel 15 in the editing/transmission area W2, a drawn image Ia is displayed in the editing/transmission area W2 in accordance with the touch input. With this operation, the user can write a hand-written character, a hand-written line, or the like in the editing/transmission area W2. For example, in FIG. 11, a free curve enclosing the character "MINERAL WATER" is displayed as the drawn image Ia in accordance with a touch input to the editing/transmission area W2. Here, when displaying the drawn image Ia, the game apparatus 1 combines and displays image data indicating the drawn image Ia with the image data displayed in the editing/transmission area W2.

In FIG. 12, when the user performs a tap operation once with respect to the erase button Be, and thereafter, performs a touch operation with respect to the touch panel 15 in the editing/transmission area W2, an image displayed in the editing/transmission area W2 is erased in accordance with a touch input. For example, in the example of FIG. 12, the image displayed in the editing/transmission area W2 is erased along an area E in which the user touched the touch panel 15. With this operation, an area desired by the user can be erased from the image displayed in the editing/transmission area W2. Note that a description M indicating the information source or the like of the sentence data copied to the editing/transmission area W2 cannot be erased by this erase operation. For example, by setting an area in the vicinity of the description M to be an edit-disabled area, erasing of the description M and overwriting onto the description M are prevented. By disabling the description M to be edited, when sentence data for which a copyright display is required is transmitted, the display is prevented from being erased.

In FIG. 13, when the user performs a tap operation with respect to the transmit button B5, an image displayed in the editing/transmission area W2 is transmitted to another game apparatus 1r (transmission destination). Typically, the game apparatus 1 (transmission source) and the game apparatus 1r (transmission destination) are composed of the same hardware. Note that the game apparatus 1r (transmission destination) needs to store a program described below with reference to FIG. 23 and data for executing the program (a program for searching dictionary data or the like is not required), however, the game apparatus 1r (transmission destination) does not need to include a memory card storing dictionary data. In other words, the game apparatus 1 (transmission source) and the game apparatus 1r (transmission destination) both have the following configuration.

a program capable of inputting a hand-written image or a character in accordance with an input to the touch panel 15 a transmission program of transmitting an input hand-written image or character to other game apparatuses a reception program of receiving a hand-written image or a character from other game apparatuses a program of displaying a received hand-written image or character in accordance with an input to the touch panel 15 a transmission program of transmitting an edited hand-written image or character to other game apparatuses With the above-described configuration, it is possible to edit and transfer a hand-written image or a character between game apparatuses. The game apparatus 1 of at least a transmission source includes dictionary data and a search engine thereof, and can edit an output result of dictionary data using the editing program, and transmit the resultant data using the transmission program.

Here, when another game apparatus 1r is present within a wireless transmission range of the wireless communications section 33 of the game apparatus 1 operated by the user, wireless communications can be permitted by previously causing the game apparatuses 1 and 1r to belong to a transmission/reception group or the like. In this case, when the user performs a tap operation with respect to the transmit button B5, an image displayed in the editing/transmission area W2 is transmitted to the game apparatus 1r which belongs to the group. Here, assuming that image data and text data coexist in the editing/transmission area W2, the game apparatus 1 converts all the text data into image data and combines these pieces of image data into one piece of transmission image data before transmitting the image displayed in the editing/transmission area W2. The image indicated by the transmission image data includes the description M indicating the information source or the like of the sentence data copied to the editing/transmission area W2.

In FIG. 14, in the game apparatus 1r (receiver side) which has received transmission image data transmitted from the game apparatus 1, for example, an image Ir indicated by the transmission image data is displayed on the first LCD 11r. By receiving the transmission image data, the user of the game apparatus 1r can view an image which has been edited by the user of the game apparatus 1 using the editing/transmission area W2. Note that, since the transmission image data includes character information about a desired word which has been retrieved from the electronic dictionary by the user of the game apparatus 1, the user of the game apparatus 1r can view the character information. In other words, character information which has been retrieved from the electronic dictionary by the user of the game apparatus 1 can be shared and viewed by the user of the game apparatus 1r which can communicate with the game apparatus 1.

In addition, the game apparatus 1r (receiver side) can edit the received image Ir. For example, when a tap operation is performed with respect to a copy button Bc, the image Ir is copied to an editing/transmission area W2r of the game apparatus 1r. In this case, as in the game apparatus 1, the image Ir displayed in the editing/transmission area W2r can be edited. In addition, when a tap operation is performed with respect to a transmit button Bt, the game apparatus 1r can transmit (return) an image edited in the editing/transmission area W2r to other game apparatuses (e.g., the game apparatus 1).

Note that, as illustrated in FIG. 15, assuming that the user performs a tap operation with respect to the transmit button B5 to transmit transmission image data to the game apparatus 1r, if communications error occurs due to some reason, information IF indicating that matter is displayed on the second LCD 12 of the game apparatus 1 (transmission source). Also, in the above-described process, communications error occurs during communication with the game apparatus 1r, similar information IF is displayed on the second LCD 12 of the game apparatus 1 (transmission source).

In FIG. 16, when the user performs a tap operation with respect to the clear button B3, all displays of the search word display area W1, the editing/transmission area W2, and the text input area W3 are cleared. By operating the clear button B3, all operations which have been performed so far can be cleared. Thereafter, when search is performed with respect to a new word, the operations described in FIGS. 3 and 4 are performed again.

Figure 17:
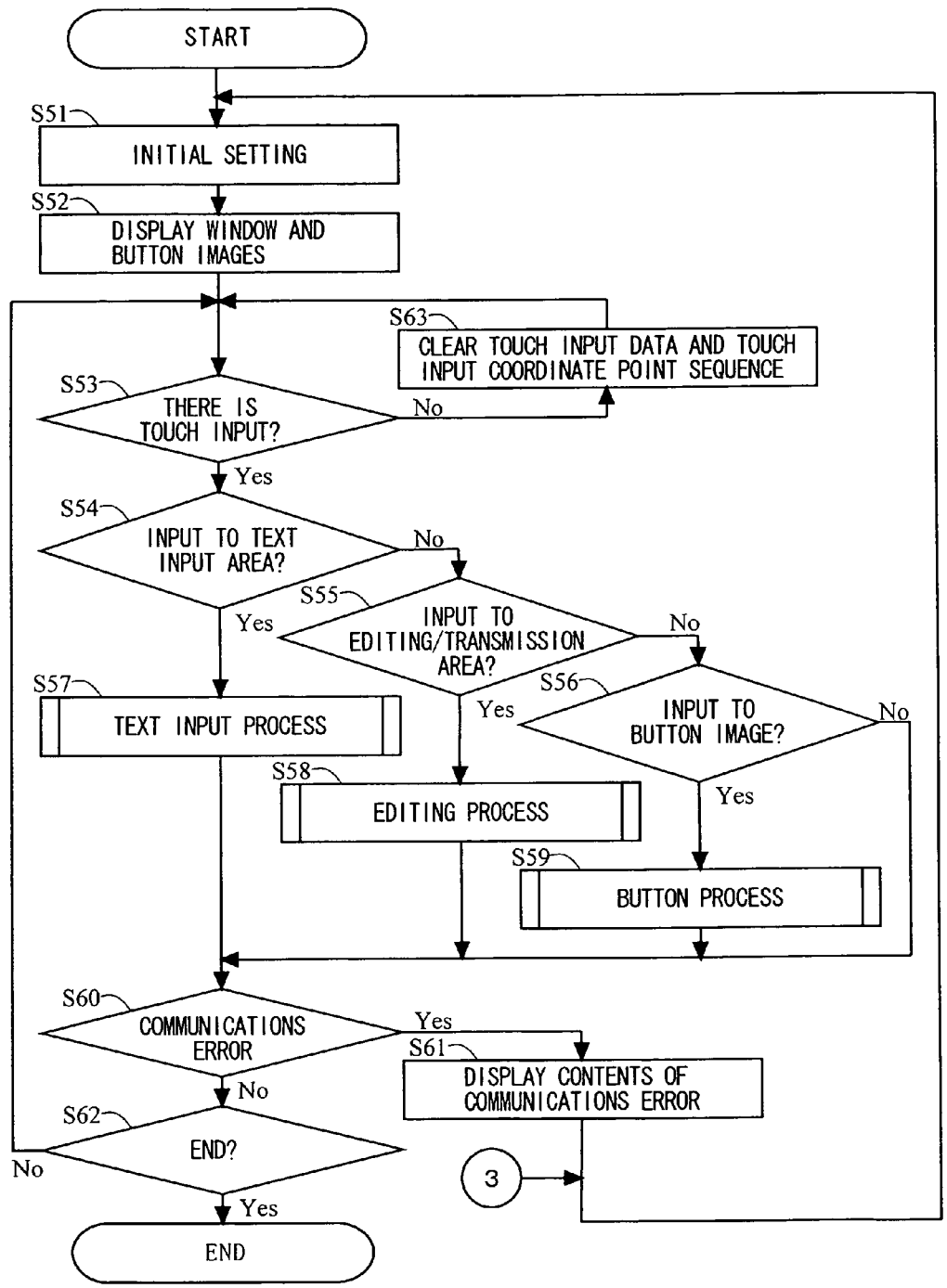
FIG. 17 is a flowchart indicating a processing operation performed by the game apparatus 1 executing a program which is to be executed by the game apparatus 1.
Figure 19:
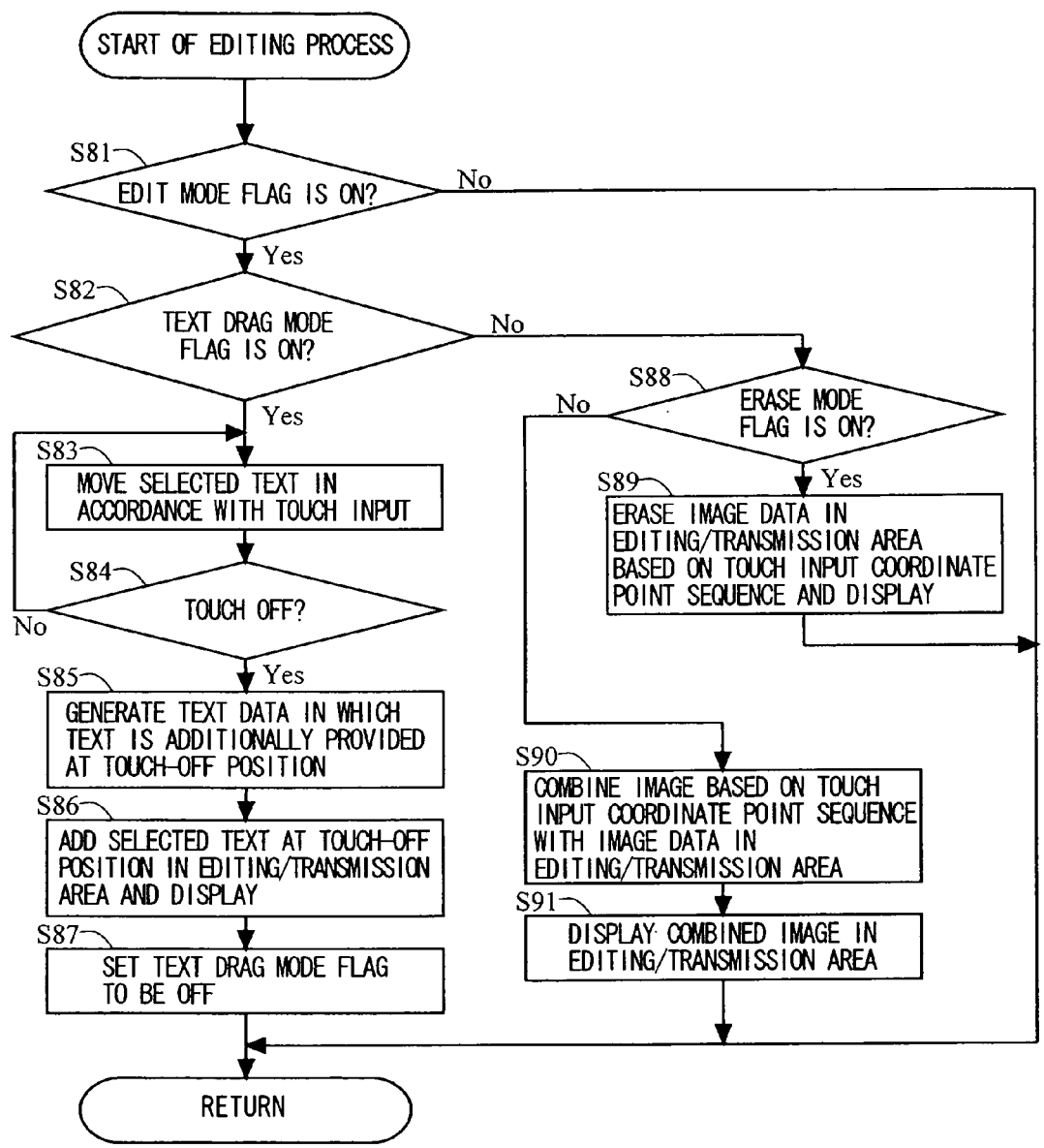
FIG. 19 is a subroutine indicating a detailed operation of an editing process in step 58 of FIG. 17.
Figure 20:
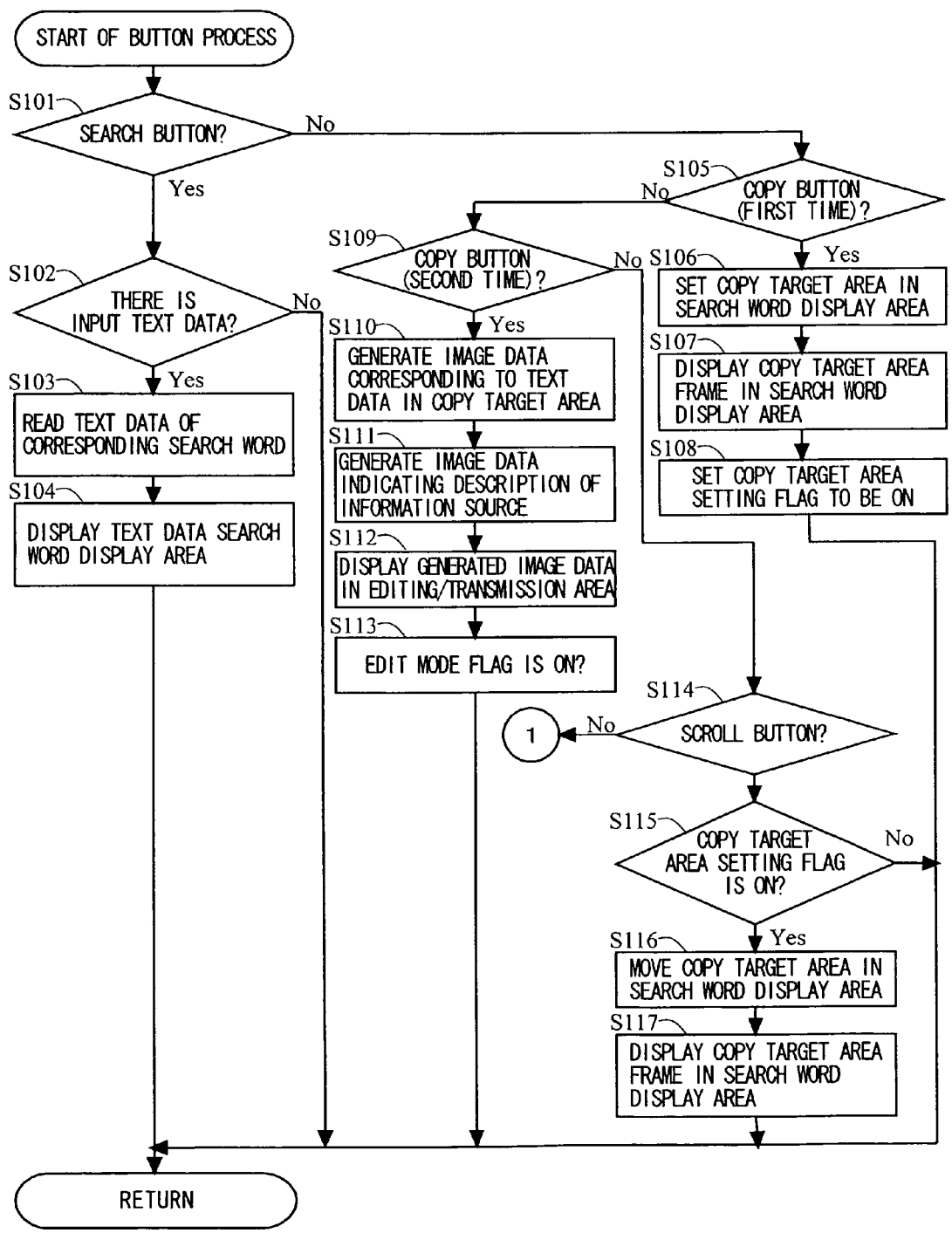
FIG. 20 is a subroutine indicating a detailed operation of a button process in step 59 of FIG. 17.
Figure 21:
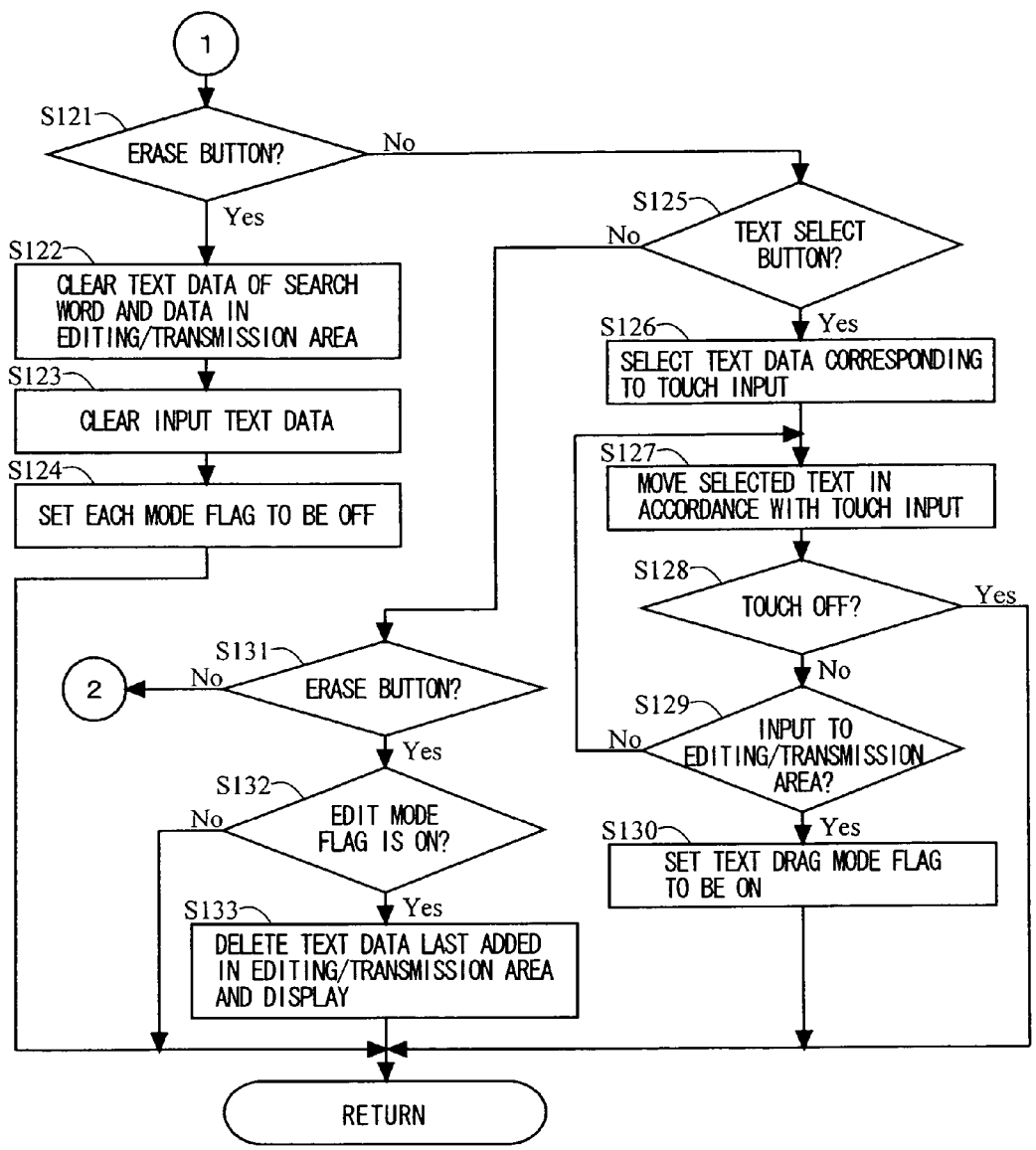
FIG. 21 is a subroutine indicating a detailed operation of a button process in step 59 of FIG. 17.
Figure 22:
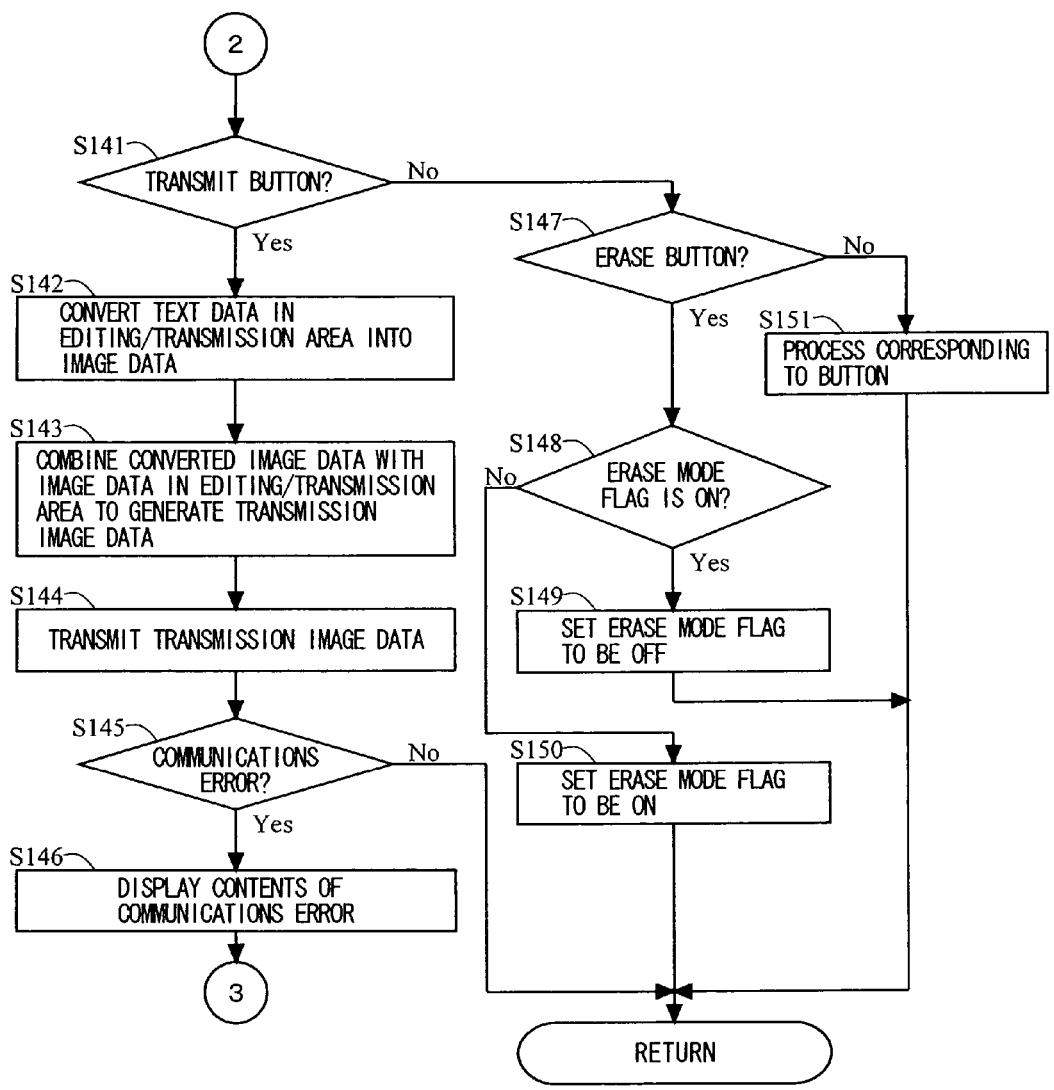
FIG. 22 is a subroutine indicating a detailed operation of a button process in step 59 of FIG. 17.
Figure 23:
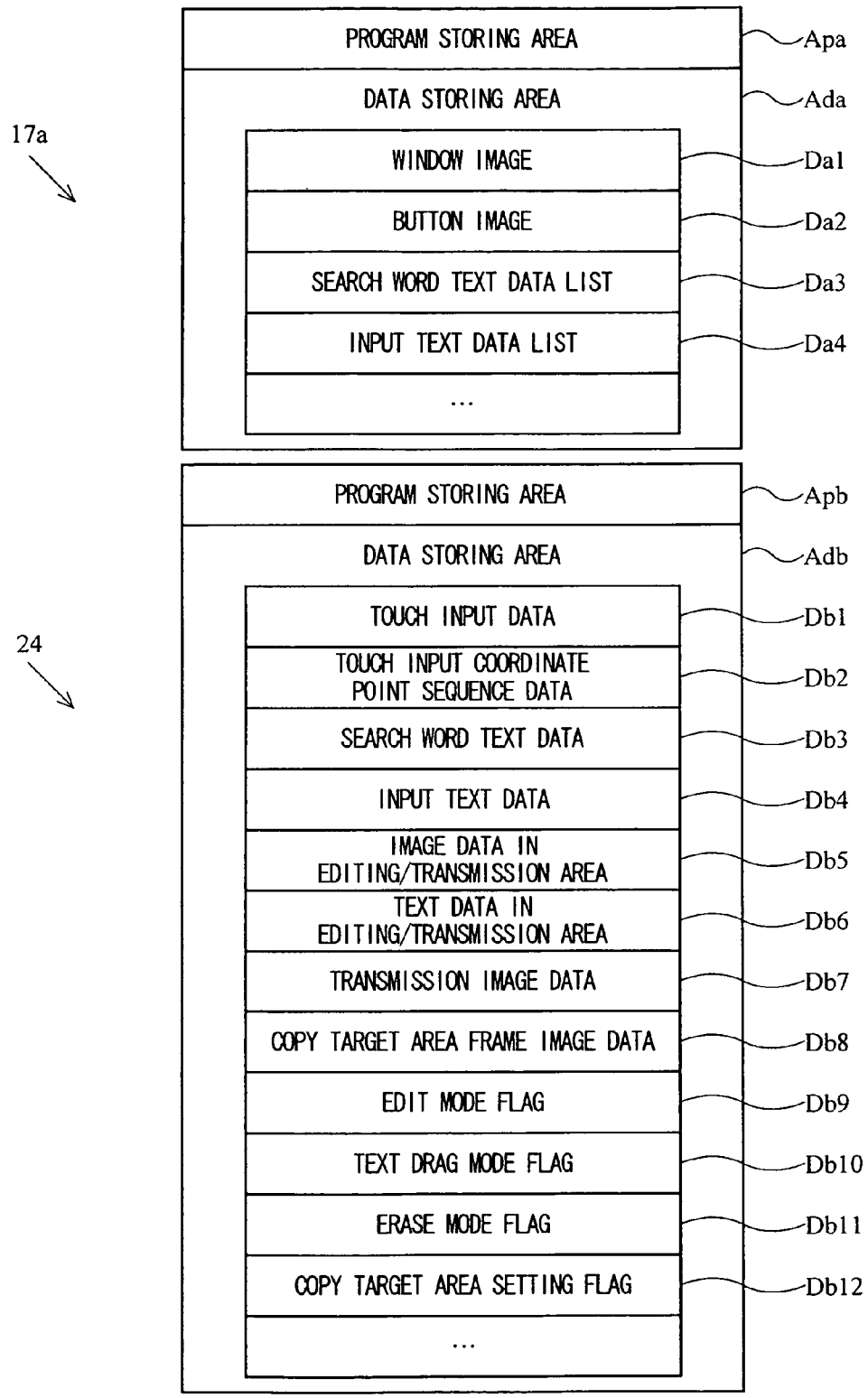
FIG. 23 is a diagram illustrating various data which are stored in a ROM 17a and are used in the process operations based on FIGS. 17 to 22 and various data which are stored in a RAM 24 in the process operations.

Next, a specific processing operation performed by the program executed in the game apparatus 1 will be described with reference to FIGS. 17 to 23. Note that FIG. 17 is a flowchart indicating the processing operation performed by the game apparatus 1 executing the program. FIG. 18 is a subroutine indicating a detailed operation of a text input process in step 57 of FIG. 17. FIG. 19 is a subroutine indicating a detailed operation of an editing process in step 58 of FIG. 17. FIGS. 20 to 22 are subroutines indicating a detailed operation of a button process in step 59 of FIG. 17. FIG. 23 is a diagram illustrating various data which are stored in a ROM 17a and are used in the process operations based on FIGS. 17 to 22 and various data which are stored in a RAM 24 in the process operations.

In FIG. 23, a program for executing a process described below is included in a program stored in a program storing area Apa of the ROM 17a, and when the game apparatus 1 is powered on, is read from the ROM 17a to a program storing area Apb of the RAM 24, and is executed by the CPU core 21. When the CPU core 21 executes the program, data stored in a data storing area Ada of the ROM 17a is used as appropriate. For example, in the data storing area Ada, a window image Da1, a button image Da2, the search word text data list Da3, the input text data list Da4, and the like are stored. The window image Da1 is image data for displaying the search word display area W1, the editing/transmission area W2, and the text input area W3 (see FIG. 3), and the like on the first LCD 11 and the second LCD 12. The button image Da2 is image data for displaying the search button B1, the copy button B2, the clear button B3, the delete button B4, the transmit button B5, the up scroll button Bu, the down scroll button Bd, the erase button Be, the character type select button Bw, and the text select button D1 (see FIG. 3), and the like on the first LCD 11 and the second LCD 12. The search word text data list Da3 is a database which stores sentence data (text data) which can be searched in the electronic dictionary, and in which sentence data corresponding to an input character (s) can be searched for. The input text data list Da4 is comparison data for searching for a character (s) (text data) which matches a user's hand-written input.

In the processing operation, the various data stored in the RAM 24 are stored into a data storing area Adb as appropriate. For example, in the data storing area Adb, touch input data Db1, touch input coordinate point sequence data Db2, search word text data Db3, input text data Db4, editing/transmission area image data Db5, editing/transmission area text data Db6, transmission image data Db7, copy target area frame image data Db8, an edit mode flag Db9, a text drag mode flag Db10, an erase mode flag Db11, a copy target area setting flag Db12, and the like are stored. The touch input data Db1 is coordinate data of a touch panel coordinate system which is input from the touch panel 15 and is updated as appropriate in accordance with a user's touch input. The touch input coordinate point sequence data Db2 is data which indicates a series of coordinate groups until the user releases the stick 16 off the touch panel 15 and in which coordinate data stored as the touch input data Db1 are indicated in time series. The search word text data Db3 is text data which is extracted from the search word text data list Da3 by a user's search operation. The input text data Db4 is text data which is detected from the input text data list Da4 and corresponds to a user's hand-written input. The editing/transmission area image data Db5 is data which is stored in the form of image data of an image displayed in the editing/transmission area W2, and also indicates a position of each piece of image data in the editing/transmission area W2. The editing/transmission area text data Db6 is data which is stored in the form of text data of an image displayed in the editing/transmission area W2, and also indicates a position of each piece of text data in the editing/transmission area W2. The transmission image data Db7 is image data which is transmitted to the game apparatus 1r. The copy target area frame image data Db8 is image data for displaying the outer frame of the copy target area Ac in the search word display area W1. The edit mode flag Db9, the text drag mode flag Db10, the erase mode flag Db11, and the copy target area setting flag Db12 are flag data for distinguishing process stages from each other in the processing operation.

Initially, when a power supply (not shown) of the game apparatus 1 is switched on, a boot program (not shown) is executed by the CPU core 21, thereby loading a program stored in the program storing area Apa of the ROM 17a into the RAM 24. The loaded program is executed by the CPU core 21, thereby executing steps illustrated in FIG. 17 ("S" is omitted in FIGS. 17 to 22).

In FIG. 17, initial setting of the game apparatus 1 is performed (step 51), and the procedure goes to the next step. Here, in the initial setting performed by the CPU core 21, setting of each of the various data values of the ROM 17a and the RAM 24 (FIG. 23) is performed, and setting of communications with respect to the game apparatus 1r is performed. For example, when another game apparatus 1r is present within a wireless communications range of the wireless communications section 33 of the game apparatus 1, communications setting is performed so as to enable data transmission to the game apparatus 1r. For example, when transmission and reception are performed between the game apparatus 1 and the game apparatus 1r using a data frame, the CPU core 21 performs setting of identification, such as a transmission destination ID, a transmission source ID, and the like. Specifically, the transmission destination ID is set to be an ID possessed by the game apparatus 1r which is a destination of data. The transmission source ID is an ID possessed by the game apparatus 1 which transmits data. With these communications settings, the game apparatus 1 is in a state which enables data transmission/reception with respect to the game apparatus 1r. Each data value stored in the data storing area Adb is initialized. For example, the mode flags Db9 to Db12 are each set to be OFF.

Next, the CPU core 21 uses the window image Da1 and the button image Da2 to display a window and a button image on the first LCD 11 and the second LCD 12 (step 52). Thereafter, the CPU core 21 waits for a touch input from the touch panel 15 (step 53). Note that, when there is not a touch input from the touch panel 15 (No in step 53), the CPU core 21 clears the touch input data Db1 and the touch input coordinate point sequence data Db2 (step 63).

When there is a touch input from the touch panel 15 (Yes in step 53), the CPU core 21 stores a touch coordinate point corresponding to the touch input, as the touch input data Db1, into the data storing area Adb. Note that, when the previous touch input data Db1 in a series of touch operations (i.e., the user continues to touch the touch panel 15) is stored, the CPU core 21 stores the previous touch input data Db1 as latest data of the touch input coordinate point sequence data Db2. Thereafter, the CPU core 21 determines which of the text input area W3, the editing/transmission area W2, and a button image the coordinate point indicated by the touch input data Db1 is positioned in (steps 54 to 56). When the coordinate point indicated by the touch input data Db1 is positioned in the text input area W3 (Yes in step 54), the CPU core 21 performs a text input process (step 57), and goes to the next step 60. When the coordinate point indicated by the touch input data Db1 is positioned in the editing/transmission area W2 (Yes in step 55), the CPU core 21 performs an editing process (step 58), and goes to the next step 60. When the coordinate point indicated by the touch input data Db1 is positioned in a button image (Yes in step 56), the CPU core 21 performs a button process (step 59), and goes to the next step 60. Note that, when the coordinate point indicated by the touch input data Db1 is not positioned in any of the text input area W3, the editing/transmission area W2, and a button image (No in all steps 54 to 56), the CPU core 21 does not perform a process, and goes to the next step 60. Note that detailed operations for the text input process, the editing process, and the button process in steps 57 to 59 will be described below.

In step 60, the CPU core 21 determines whether or not communications error has occurred in communications which has been established between the game apparatus 1 and the game apparatus 1r in step 51. Here, the communications between the game apparatus 1 and the game apparatus 1r may be disabled due to a change in a communications environment during the above-described processes. In order to monitor such a change in the communications environment, the game apparatus 1 regularly confirms the communications between the game apparatus 1 and the game apparatus 1r on the background of the process. When communications error has occurred, the CPU core 21 displays the information IF indicating that matter on the second LCD 12 (step 61; see FIG. 15), and goes back to step 51, in which initial setting is performed again. This reporting function enables the user to revamp settings for communications between the game apparatus 1 and the game apparatus 1r. On the other hand, when communications error has not occurred, the CPU core 21 goes to the next step 62.

In step 62, the CPU core 21 determines whether or not the procedure of the flowchart is ended. When the result of the determination is negative, the CPU core 21 returns to step 53 and continues the procedure. When the result of the determination is positive, the procedure of the flowchart is ended.

The text input process performed in step 57 will be described with reference to FIG. 18. The CPU core 21 references the touch input coordinate point sequence data Db2, and displays an image obtained by connecting a coordinate point sequence connecting touch inputs in time series in the text input area W3 (step 71; see FIG. 3). Next, the CPU core 21 compares the image obtained by connecting the coordinate point sequence with the input text data list Da4 (step 72), to determine whether or not the input text data list Da4 has text data which matches the image obtained by connecting the coordinate point sequence (step 73). When there is text data which matches the image obtained by connecting the coordinate point sequence, the CPU core 21 goes to the next step 74. On the other hand, when there is not text data which matches the image obtained by connecting the coordinate point sequence, the CPU core 21 ends the subroutine.

In step 74, the CPU core 21 saves the text data which matches the image obtained by connecting the coordinate point sequence, as the input text data Db4, into the data storing area Adb. Next, the CPU core 21 determines whether or not the edit mode flag Db9 is ON (step 75). When the edit mode flag Db9 is ON, the CPU core 21 goes to the next step 76. On the other hand, when the edit mode flag Db9 is OFF, the CPU core 21 ends the subroutine.

In step 76, the CPU core 21 adds and displays the input text data Db4 saved in step 74 at a position of the cursor C placed in the editing/transmission area W2 (see FIG. 7), and ends the subroutine. In this case, the CPU core 21 clears the input text data Db4. The CPU core 21 also adds the input text data Db4 to the editing/transmission area text data Db6, and uses the editing/transmission area image data Db5 and the editing/transmission area text data Db6 to display a superposed image of the image data and the text data in the editing/transmission area W2. In other words, the editing/transmission area image data Db5 and the editing/transmission area text data Db6 coexist in data for displaying an image in the editing/transmission area W2. Note that, all text data other than the text data added to the editing/transmission area W2 in step 76 may be converted into image data, which may be in turn combined with the editing/transmission area image data Db5. In this case, all text data other than the text data last added to the editing/transmission area W2 are converted into image data.

The editing process performed in step 58 will be described with reference to FIG. 19. Initially, the CPU core 21 determines whether or not the edit mode flag Db9 is ON (step 81). When the edit mode flag Db9 is ON, the CPU core 21 goes to the next step 82. On the other hand, when the edit mode flag Db9 is OFF, the CPU core 21 ends the subroutine.

In step 82, the CPU core 21 determines whether or not the text drag mode flag Db10 is ON. When the text drag mode flag Db10 is ON, the CPU core 21 goes the next step 83. On the other hand, when the text drag mode flag Db10 is OFF, the CPU core 21 goes to the next step 88.

In step 83, the CPU core 21 moves a text selected via the text select button D1 in the editing/transmission area W2 in accordance with a touch input (drag operation) (see FIG. 9). Next, the CPU core 21 determines whether or not the user has touched off the touch panel 15 in the editing/transmission area W2 (step 84). When the user has not touched off the touch panel 15, the CPU core 21 returns to step 83 and repeats the process. On the other hand, when the user has touched off the touch panel 15, the CPU core 21 goes to the next step 85.

In step 85, the CPU core 21 generates the editing/transmission area text data Db6 in which the selected text is added and provided at the touch-off position. Next, the CPU core 21 displays the selected text at the touch-off position in the editing/transmission area W2 (step 86; see FIG. 10), sets the text drag mode flag Db10 to be OFF (step 57), and ends the subroutine. In this case, the CPU core 21 adds text data corresponding to the selected text to the editing/transmission area text data Db6, and uses the editing/transmission area image data Db5 and the editing/transmission area text data Db6 to display a superposed image of the image data and the text data in the editing/transmission area W2. Thus, also here, the editing/transmission area image data Db5 and the editing/transmission area text data Db6 coexist in data for displaying an image in the editing/transmission area W2. Note that all text data other than the text data added to the editing/transmission area W2 in step 85 may be converted into image data and may be combined with the editing/transmission area image data Db5. In this case, all text data other than text data last added to the editing/transmission area W2 are converted into image data.

When the edit mode flag Db9 is ON and the text drag mode flag Db10 is OFF (i.e., No in step 82), the CPU core 21 determines whether or not the erase mode flag Db11 is ON in step 88. When the erase mode flag Db11 is ON, the CPU core 21 goes to the next step 89. On the other hand, when the erase mode flag Db11 is OFF, the CPU core 21 goes to the next step 90.

In step 89, the CPU core 21 references the touch input coordinate point sequence data Db2, erases an image along a line (area E) obtained by connecting a coordinate point sequence of touch inputs in time series, displays the resultant image in the editing/transmission area W2 (see FIG. 12), and ends the subroutine. In this case, the CPU core 21 erases the editing/transmission area image data Db5 in accordance with the touch input coordinate point sequence data Db2 to generate image data to be displayed in the editing/transmission area W2. Note that the CPU core 21 sets an edit-disabled area in the vicinity of the description M as described above. When the editing/transmission area image data Db5 is erased in accordance with the touch input coordinate point sequence data Db2, the CPU core 21 does not erase the edit-disabled area. Therefore, in step 89, the CPU core 21 generates image data to be displayed in the editing/transmission area W2 without erasing the description M indicating the information source or the like of sentence data copied to the editing/transmission area W2. In other words, a limitation is placed on editing of description information which indicates an information source or the like and needs to be prevented from being erased by the user.

In step 90, the CPU core 21 references the touch input coordinate point sequence data Db2 to generate image data indicating an image Ia obtained by connecting a coordinate point sequence of touch inputs in time series and combine the image data with the editing/transmission area image data Db5. Thereafter, the CPU core 21 uses the combined editing/transmission area image data Db5 to add and display the image Ia in the editing/transmission area W2 (step 91; see FIG. 11), and ends the subroutine. Note that, when the CPU core 21 adds the image Ia to the editing/transmission area image data Db5, the image Ia is not added to a portion which overlaps the edit-disabled area. Therefore, in step 90, the CPU core 21 generates image data to be displayed in the editing/transmission area W2 without overwriting drawing data onto the description M indicating the information source or the like of sentence data copied to the editing/transmission area W2. In other words, a limitation is placed on editing of description information which indicates an information source or the like and needs to be prevented from being overwritten by the user.

The button process performed in step 59 will be described with reference to FIG. 20. Initially, the CPU core 21 determines whether or not a button image to which a touch input has been performed is the search button B1 (step 101). Next, when the touch input has been performed with respect to the search button B1 (Yes in step 101), the CPU core 21 determines whether or not there is the input text data Db4 (step 102). When there is the input text data Db4, the CPU core 21 goes to the next step 103. On the other hand, when there is not the input text data Db4, the CPU core 21 ends the subroutine.

In step 103, the CPU core 21 searches the search word text data list Da3 for sentence data (text data) indicating a meaning, a synonym, or the like of a word in accordance with the input text data Db4, and stores a result of the search, as the search word text data Db3, into the data storing area Adb. In the search method of this case, data which completely matches the input text data Db4 may be searched for, or data which matches the beginning or end of a line may be searched for. Next, the CPU core 21 displays the search word text data Db3 in the search word display area W1 (step 104; see FIG. 4), and ends the subroutine.

When the touch input has not performed with respect to the search button B1 (No in step 101), the CPU core 21 determines whether or not the button image to which the touch input has been performed is the first-time copy button B2 (step 105). Next, when the first-time touch input has been performed with respect to the copy button B2 (Yes in step 105), the CPU core 21 goes to the next step 106.

In step 106, the CPU core 21 sets the copy target area Ac at an initial position in the search word display area W1. Next, the CPU core 21 uses the copy target area frame image data Db8 to display a frame image for the copy target area Ac in the search word display area W1 (step 107; see FIG. 5). Thereafter, the CPU core 21 sets the copy target area setting flag Db12 to be ON (step 108), and ends the subroutine.

When the first-time touch input has not performed with respect to the copy button B2 (No in step 105), the CPU core 21 determines whether or not the button image to which the touch input has been performed is the second-time copy button B2 (step 109). Next, when the second-time touch input has been performed with respect to the copy button B2 (Yes in step 109), the CPU core 21 goes to the next step 110.

In step 110, the CPU core 21 converts the search word text data Db3 corresponding to the copy target area Ac into image data, and stores the image data as the editing/transmission area image data Db5 into the data storing area Adb. Next, the CPU core 21 generates image data of the description M (see FIG. 12) indicating the information source of the search word text data Db3 (i.e., the information source of the search word text data list Da3) (step 111). In this case, the CPU core 21 combines the image data of the description M indicating the information source with the editing/transmission area image data Db5 stored in step 110 so that the description M is superposed at a predetermined position in the editing/transmission area W2 (e.g., an upper right corner position). Thereafter, the CPU core 21 uses the combined editing/transmission area image data Db5 to display a copied image of sentence data in the copy target area Ac in the editing/transmission area W2 (step 112; see FIG. 6). Thereby, the CPU core 21 superposes and displays the description M indicating the information source or the like of the copied sentence data at a predetermined position in the editing/transmission area W2. Thereafter, the CPU core 21 sets the edit mode flag Db9 to be ON (step 113), and ends the subroutine. Note that the CPU core 21 sets an edit-disabled area in the vicinity of the description M in the editing/transmission area W2. Such an edit-disabled area is an area in which the user cannot perform hand-written drawing, erasing, or the like (e.g., a rectangular area enclosing the description M). By the processes of steps 110 and 112, the CPU core 21 copies sentence data which is retrieved from a plurality of pieces of text data, from the search word display area W1, converts the sentence data into image data, and displays the image data in the editing/transmission area W2.

Note that, in the above-described process, by performing a tap operation two times with respect to the copy button B2, sentence data displayed in the search word display area W1 is copied to the editing/transmission area W2. Alternatively, the number of times of a tap operation until copying is not limited to two. For example, a button for setting the copy target area Ac may be provided separately from the copy button B2, and sentence data within a default range may be copied to the editing/transmission area W2 when a tap operation is performed one time with respect to the copy button B2.

When the touch input has not been performed with respect to the copy button B2 (No in step 109), the CPU core 21 determines whether the button image to which the touch input has been performed is the up scroll button Bu or the down scroll button Bd (step 114). Next, when the touch input has been performed with respect to the up scroll button Bu or the down scroll button Bd (Yes in step 114), the CPU core 21 goes to the next step 115.

In step 115, the CPU core 21 determines whether or not the copy target area setting flag Db12 is ON. When the copy target area setting flag Db12 is OFF, the CPU core 21 ends the subroutine without performing a process. On the other hand, when the copy target area setting flag Db12 is ON, the CPU core 21 moves the copy target area Ac in the search word display area W1 in accordance with a touch input performed with respect to the up scroll button Bu or the down scroll button Bd (step 116). Next, the CPU core 21 uses the copy target area frame image data Db8 to move and display the frame image of the copy target area Ac within the search word display area W1 (step 117), and ends the subroutine. Specifically, in accordance with a touch input performed with respect to the up scroll button Bu, the CPU core 21 moves the copy target area Ac within the search word display area W1 by a predetermined movement unit (e.g., on a dot-by-dot basis, on a character-by-character basis, etc.) in an upward direction. Also, in accordance with a touch input performed with respect to the down scroll button Bd, the CPU core 21 moves the copy target area Ac within the search word display area W1 by the predetermined movement unit in a downward direction.

Note that rightward and leftward scroll buttons may be provided on the second LCD 12 so that the copy target area Ac is moved in the search word display area W1 in a rightward direction or in a leftward direction in accordance with a touch input performed with respect to the rightward or leftward scroll button. Although, in the above description, the copy target area Ac is moved upward or downward in accordance with a touch input performed with respect to the up scroll button Bu or the down scroll button Bd, the position of the copy target area Ac may be fixed while text data displayed in the search word display area W1 may be scrolled upward or downward. Alternatively, when a touch input is performed with respect to the down scroll button Bd while the copy target area Ac is positioned at a lower end of the search word display area W1, text data displayed in the search word display area W1 may be scrolled upward. In other words, in accordance with a touch input performed with respect to the up scroll button Bu or the down scroll button Bd, the upward and downward movements of the copy target area Ac and the upward and downward movements of text data displayed in the search word display area W1 may be combined.

In FIG. 21, when the touch input has not been performed with respect to the up scroll button Bu or the down scroll button Bd (No in step 114; see FIG. 20), the CPU core 21 determines whether or not the button image to which the touch input has been performed is the clear button B3 (step 121). Next, when the touch input has not been performed with respect to the clear button B3 (Yes in step 121), the CPU core 21 goes to the next step 122.

In step 122, the CPU core 21 clears the search word text data Db3, the editing/transmission area image data Db5, and the editing/transmission area text data Db6. Thereby, the displays of the search word display area W1 and the editing/transmission area W2 are cleared (see FIG. 16). Next, the CPU core 21 clears the input text data Db4 (step 123). Thereafter, the CPU core 21 sets the edit mode flag Db9, the text drag mode flag Db10, the erase mode flag Db11, and the copy target area setting flag Db12 to be OFF (step 124), and ends the subroutine. Thus, all of the operations which have been performed so far can be cleared by operating the clear button B3. When a search is performed with respect to a new word, the search process of steps 101 to 105 can be performed again after the text input process of step 57.

When the touch input has not been performed with respect to the clear button B3 (No in step 121), the CPU core 21 determines whether or not the button image to which the touch input has been performed is the text select button D1 (step 125). Next, when the touch input has been performed with respect to the text select button D1 (Yes in step 125), the CPU core 21 goes to the next step 126.

In step 126, the CPU core 21 selects text data from the character group displayed in the text select button D1, based on a coordinate point indicated by the touch input data Db1. Next, the CPU core 21 moves the text in accordance with a touch input (drag operation) (step 127; see FIG. 9), determines whether or not the user has touched off (step 128) and whether or not the user has performed a touch input with respect to the editing/transmission area W2 (step 129), and repeatedly performs the processes of steps 127 to 129 until a touch input is performed with respect to the editing/transmission area W2. When the user has touched off (Yes in step 128), the CPU core 21 ends the subroutine. On the other hand, when a touch input has been performed with respect to the editing/transmission area W2 (Yes in step 129), the CPU core 21 sets the text drag mode flag Db10 to be ON (step 130), and ends the subroutine.

When the touch input has not been performed with respect to the text select button D1 (No in step 125), the CPU core 21 determines whether or not the button image to which the touch input has been performed is the delete button B4 (step 131). Next, when the touch input has been performed with respect to the delete button B4 (Yes in step 131), the CPU core 21 goes to the next step 132.

In step 132, the CPU core 21 determines whether or not the edit mode flag Db9 is ON. When the edit mode flag Db9 is ON, the CPU core 21 deletes text data last added to the editing/transmission area W2 from the editing/transmission area text data Db6, deletes a character corresponding to the last text data from the editing/transmission area W2, displays the resultant text data (step 133; see FIG. 8), and ends the subroutine. On the other hand, when the edit mode flag Db9 is OFF, the CPU core 21 ends the subroutine without performing a process.

In FIG. 22, when the touch input has not been performed with respect to the delete button B4 (No in step 131; see FIG. 21), the CPU core 21 determines whether or not the button image to which the touch input has been performed is the transmit button B5 (step 141). Next, when the touch input has been performed with respect to the transmit button B5 (Yes in step 141), the CPU core 21 goes to the next step 142.

In step 142, the CPU core 21 converts all the editing/transmission area text data Db6 into image data. Next, the CPU core 21 combines the image data converted in step 142 with the editing/transmission area image data Db5 to generate the transmission image data Db7 (step 143). In this case, the CPU core 21 generates the transmission image data Db7 including the description M indicating the information source or the like of copied sentence data. Thereafter, the CPU core 21 transmits the transmission image data Db7 via the wireless communications section 33 to another game apparatus 1r (step 144; see FIG. 13), and goes to the next step.

Next, the CPU core 21 determines whether or not communications error has occurred with respect to the transmission process of step 144 (step 145). When communications error has occurred, the CPU core 21 displays the information IF indicating that matter on the second LCD 12 (step 146; see FIG. 15), the CPU core 21 returns to step 51 (see FIG. 17) and performs initial setting again. On the other hand, when communications error has not occurred, the CPU core 21 ends the subroutine without performing a process.

When the touch input has not been performed with respect to the transmit button B5 (No in step 141), the CPU core 21 determines whether or not the button image to which the touch input has been performed is the erase button Be (step 147). Next, when the touch input has been performed with respect to the erase button Be (Yes in step 147), the CPU core 21 goes to the next step 148.

In step 148, the CPU core 21 determines whether or not the erase mode flag Db11 is ON. When the erase mode flag Db11 is ON, the CPU core 21 sets the erase mode flag Db11 to be OFF (step 149), and ends the subroutine. On the other hand, when the erase mode flag Db11 is OFF, the CPU core 21 sets the erase mode flag Db11 to be ON (step 150), and ends the subroutine.

When the touch input has not been performed with respect to the erase button Be (No in step 147), the CPU core 21 performs a process corresponding to the button image to which the touch input has been performed (step 151), and ends the subroutine.

As described above, according to the game apparatus which executes the program of this example, it is possible to easily edit sentence data of an electronic dictionary or the like which is retrieved in accordance with headword data, and easily transmit the resultant data to other game apparatuses. In other words, sentence data of an electronic dictionary or the like can be used as a communication tool in new applications. In addition, in a game apparatus (receiver side), an image of the edited sentence data can be viewed, and since the image includes character information retrieved from the electronic dictionary or the like, the character information can also be viewed. In other words, a plurality of users can share and view character information retrieved from electronic dictionary or the like.

Although, in the above description, display forms are changed using a specific operation procedures for the purpose of providing a specific description, these operation procedures are only for illustrative purposes. The present invention is not limited to these operation procedures. In the above description, text data retrieved from an electronic book is once displayed in the search word display area W1, and thereafter, desired sentence data is copied to the editing/transmission area W2. Alternatively, for example, text data retrieved from an electronic book may be immediately converted into image data and displayed in the editing/transmission area W2.

Also in the above processing operation, in step 111, the image data of the description M indicating the information source of sentence data is generated, and is combined with the editing/transmission area image data Db5. Thereby, at the time when the sentence data is copied to the editing/transmission area W2, the description M provided in an edit-disabled area is displayed. In other words, the user of the game apparatus 1 can be aware of the description M indicating the information source, which is disabled to be edited. When such an effect is not expected, data about the description M indicating the information source of sentence data may be added at the time of transmitting data. For example, in step 143, the image data of the description M indicating the information source of sentence data may be generated, and combined with other image data to generate the transmission image data Db7 in a manner which displays the description M at a predetermined position. When the transmission image data Db7 is transmitted in step 144, the image data of the description M indicating the information source of sentence data may be integrated and transmitted with the transmission image data Db7. In this case, the game apparatus 1r (receiver side) combines the image data of the description M with the transmission image data Db7 to display sentence image in which the description M is displayed at a predetermined position. In either case, the user of the game apparatus 1r (receiver side) can be aware of the description M indicating the information source.

Figure 24:
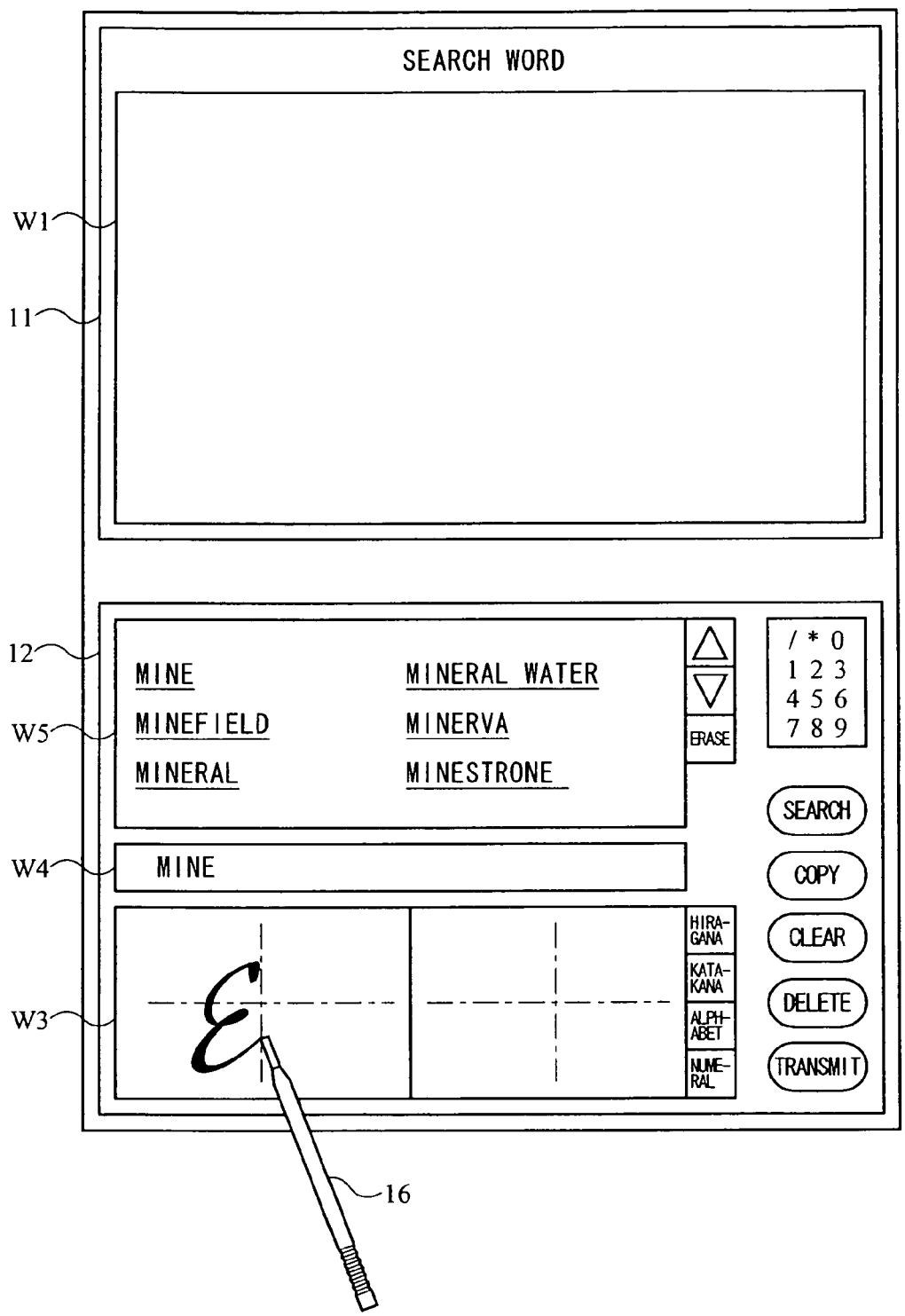
FIG. 24 is a diagram illustrating exemplary screen displays displayed on the first LCD 11 and second LCD 12 when hand-written characters are recognized per character, and search word candidates are set for the recognized characters.

Regarding text input for a word search, a method of inputting the whole word which the user wants to perform search, in a hand-writing manner (i.e., the whole search word "MINERAL WATER" is input by hand writing), has been described. However, a word search may be performed using other methods. For example, as illustrated in FIGS. 24 and 25, hand-written characters may be recognized on a character-by-character basis, and a desired search word may be selected from search word candidates corresponding to the recognized characters.

Figure 25:
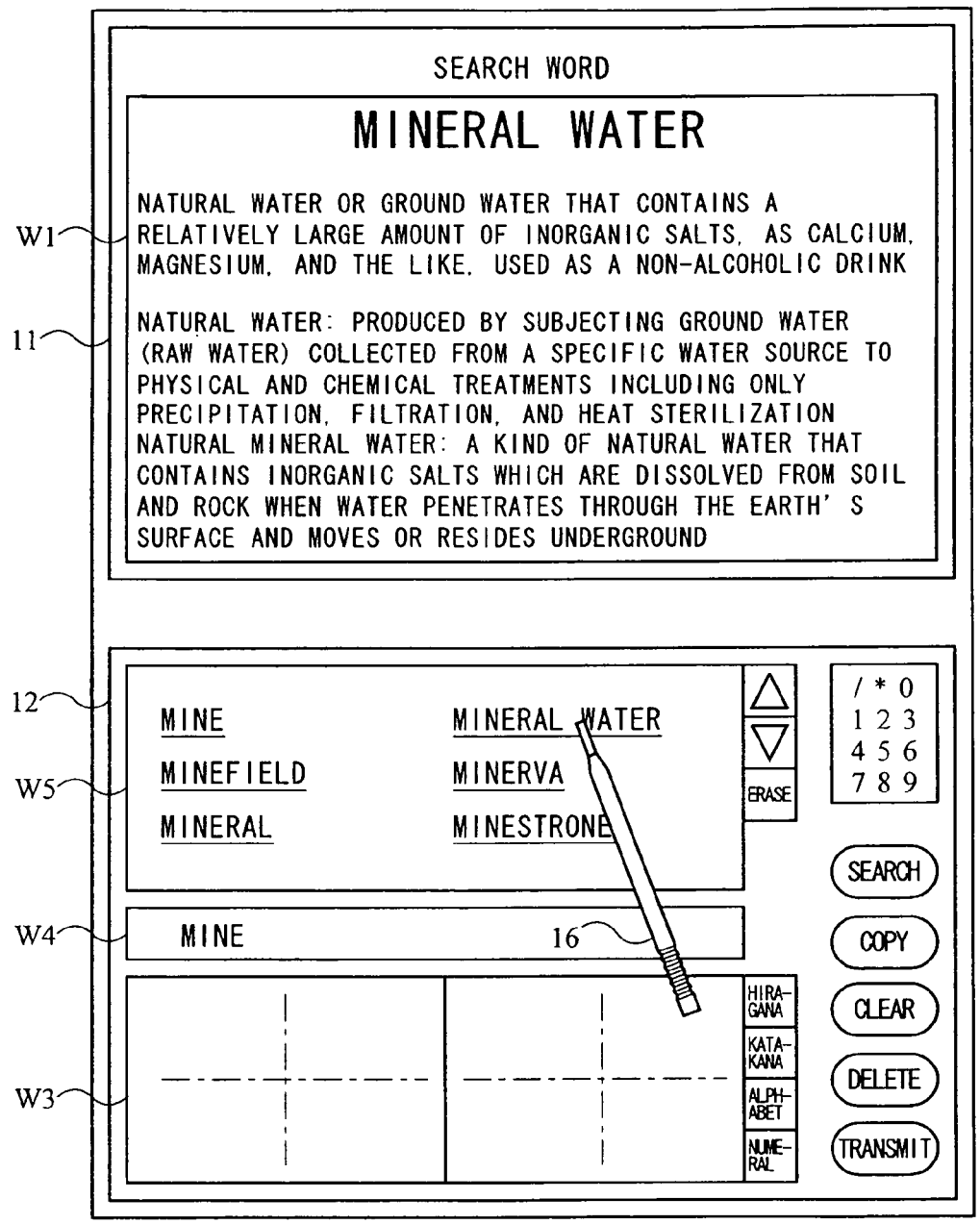
FIG. 25 is a diagram illustrating exemplary screen displays displayed on the first LCD 11 and second LCD 12 when a desired search word is selected from search word candidates.

In FIG. 25, in addition to the text input area W3, an input word display area W4 and a search word candidate display area W5 are provided on the second LCD 12 instead of the editing/transmission area W2. Note that a frame for inputting a hand-written character is provided per character in the text input area W3.

When the user performs a touch operation with respect to the touch panel 15 on the text input area W3, a character corresponding to the touch operation is recognized. Here, when a character is input to the text input area W3, the user initially performs a touch operation with respect to any of character type select buttons, thereby selecting the type of a character to be input. Specifically, as illustrated in FIG. 24, the character type select buttons include buttons for selecting the following character types: "hiragana", "katakana", "alphabet", and "numeral". By the user performing a tap operation with respect to the touch panel 15 on any of the buttons, a character type is determined.

Thereafter, when the user performs a touch operation with respect to the touch panel 15 so that one character which the user wants to input to the text input area W3 is drawn within a predetermined frame, the game apparatus 1 displays an image corresponding to the touch input in the text input area W3. Thereafter, the game apparatus 1 compares the touch input with the input text data list Da4 (see FIG. 23), recognizes a character having a most similar shape, and sequentially adds and displays the result of the recognition in the input word display area W4. In the example of FIG. 24, the user uses the stick 16 to input a character "E" by hand writing. Thereafter, the game apparatus 1 compares the touch input with the input text data list Da4, recognizes a character "E" which has a shape most similar to the hand-written character "E", and the recognized character "E" is added and displayed next to the previously recognized characters "MIN" in the input word display area W4. Note that these recognized characters are stored as the input text data Db4.

Every time a recognized character is added to the input word display area W4, the game apparatus 1 uses the search word text data list Da3 to display search word candidates (e.g., matching the beginning of a line) corresponding to the recognized character in the search word candidate display area W5. In the example of FIG. 24, for the recognized characters "MINE" displayed in the input word display area W4, six search word candidates, "MINE", "MINEFIELD", "MINERAL", "MINERAL WATER", "MINERVA", and "MINESTRONE", are displayed.

In FIG. 25, after the search word candidates are displayed in the search word candidate display area W5, when the user performs a tap operation on any of the search word candidate, a description of a word corresponding to the selected search word is displayed as character information in the search word display area W1 of the first LCD 11. In the example of FIG. 25, in accordance with a tap operation performed with respect to the search word candidate "MINERAL WATER", sentence data indicating a meaning, a synonym, or the like of the word is retrieved from electronic dictionary data (the search word text data list Da3), and at least a portion of the sentence data is displayed in the search word display area W1.

Although, in the above description, data to be subjected to a search operation (the search word text data list Da3) is assumed to be text data, the data may be in other forms. For example, data in a form in which image data is added to text data (e.g., electronic book data in an illustrated book) may be subjected to a search. In this case, an image displayed in the search word display area W1 may be displayed based on data in the form in which image data is added to text data. When the data is copied to the editing/transmission area W2, text data included in the data may be converted into image data, and the converted image data may be combined with the added image data to generate the editing/transmission area image data Db5.

In the above-described embodiment, as an example of a double-screen liquid crystal display section, the case where the first LCD 11 and the second LCD 12, which are physically separated, are provided vertically (two upper and lower screens) has been described. However, the double-screen display screen may be configured in other manners. For example, the first LCD 11 and the second LCD 12 may be laterally provided on a major surface of the lower housing 13b. Alternatively, a portrait-size LCD which has the same width as that of the second LCD 12 and a length two times larger than that of the second LCD 12 (i.e., a physically one screen which has a display size having a length corresponding to two screens) may be provided on a major surface of the lower housing 13b so that first and second book images may be vertically displayed (i.e., displayed adjacent to each other without a border portion between the upper and lower screens). Alternatively, a landscape-size LCD which has the same length as that of the second LCD 12 and a width two times larger than that of the second LCD 12 is provided on a major surface of the lower housing 13b so that first and second book images are laterally displayed (i.e., displayed adjacent to each other without a border portion between the right and left screens). In other words, one screen may be physically divided into two so that first and second book images are displayed. In any of the game image forms, the touch panel 15 is provided on a screen on which a second book image is displayed, thereby making it possible to similarly achieve the present invention.

Also in the above-described example, the touch panel 15 is integrated with the game apparatus 1. Alternatively, the game apparatus and the touch panel may be separately provided, and in this case, the present invention can be achieved. In addition, the touch panel 15 may be provided on an upper surface of the first LCD 11. In the above-described example, two display screens (the first LCD 11 and the second LCD 12) are provided. However, only one display screen may be provided. Specifically, in the above-described example, the first LCD 11 may not be provided and only the second LCD 12 may be used as a display screen and the touch panel 15 may be provided on the second LCD 12. In addition, in the above-described example, the second LCD 12 may not be provided and the touch panel 15 may be provided on the upper surface of the first LCD 11.

Although, in the above-described example, a touch panel is used as input means for the game apparatus 1, other pointing devices may be used. Here, the pointing device is an input device which designates an input position or coordinate point on a screen. For example, when a mouse, a track pad, a track ball, or the like is used as coordinate input means, and information of a screen coordinate system calculated from an output value output from the coordinate input means is used, the present invention can be similarly achieved.

In the above-described example, the touch panel 15 is integrated with the game apparatus 1. Alternatively, the game apparatus 1 may be an information processing apparatus including for example, a general personal computer having a pointing device, such as a touch panel, a mouse, or the like, as coordinate input means.

The storage medium which stores the program of the present invention, the information processing apparatus of the present invention, and the information processing system of the present invention, can use sentence data retrieved corresponding to headword data in an electronic dictionary or the like in new applications, and are useful as an information processing apparatus, such as a game apparatus which displays the sentence data on a display device, or the like, and a program, an information processing system, and the like which are executed in the information processing apparatus.

While the invention has been described in detail, the foregoing description is in all aspects illustrative and not restrictive. It is understood that numerous other modifications and variations can be devised without departing from the scope of the invention.

What is claimed is:

1. A non-transitory storage medium storing a program which is executable by a computer of an apparatus which is configured to display information in at least first, second and third different display areas and which includes a coordinate input device, the program, when executed, causing the computer to perform operations comprising:

receiving an input corresponding to a user's operation in the third display area;

determining headword data corresponding to the received input and searching, for sentence data that describes in detail a meaning of the headword data, a data group including at least sentence data in the form of text data corresponding to a plurality of pieces of headword data;

displaying, in the first display area, at least a portion of a sentence image based on retrieved sentence data;

copying at least a portion of the sentence image displayed in the first display area and displaying the copied portion in the second display area;

detecting a coordinate point output from the coordinate input device;

editing the sentence image displayed in the second display area in accordance with the detected coordinate point; and transmitting the edited sentence image, via a communications section, to another apparatus.

2. The storage medium storing the program according to claim 1, wherein the copying includes:

setting a copy range within which the sentence image displayed in the first display area is copied to the second display area; and moving the copy range in accordance with received input.

3. The storage medium storing the program according to claim 1, wherein the coordinate input device is configured to designate a screen coordinate point in the third display area, the program causes the computer to perform further operations comprising:

recognizing a character input in the third display area in accordance with a time-series coordinate point sequence connecting detected coordinate points in the third display area; and setting a candidate for the headword data corresponding to the recognized character when searching for sentence data, and wherein after the sentence data is searched for, the recognized character is added to a predetermined position in the sentence image, the set headword data candidate is displayed in the second display area when searching for the sentence data corresponding to the recognized character, and the recognized character is added to the copied sentence image and displayed at a predetermined position when the sentence image is edited in accordance with the recognized character.

4. The storage medium storing the program according to claim 1, wherein the program causes the computer to perform further operations comprising regularly monitoring a communications status between the apparatus and another apparatus via the communications section, and when a communications error between the apparatus and the monitored apparatus is detected, displaying information notifying of the occurrence of the communications error.

5. The storage medium storing the program according to claim 1, wherein the program causes the computer to perform further operations comprising, when at least a portion of the sentence image is displayed, providing a display area in which the sentence data cannot be edited, adding an image indicating a production source of the sentence data to the sentence image, and displaying the image indicating a production source in the display area which cannot be edited.

6. The storage medium storing the program according to claim 1, wherein the program causes the computer to perform further operations comprising generating production source data indicating a production source of the sentence data, and displaying the edited sentence image together with the production source data, the edited sentence image being integrated with the production source data.

7. The storage medium storing the program according to claim 6, wherein a production source image comprising a name of the production source as the production source data is generated, and the edited sentence image is combined and transmitted with the production source image.

8. The storage medium storing the program according to claim 1, wherein the program causes the computer to perform further operations comprising:

generating a production source image comprising a name of a production source of the sentence data; and combining the production source image in a partial area of the sentence image based on the retrieved sentence data, and wherein the combined sentence image is displayed, and the combined sentence image is editable in accordance with the detected coordinate point, and an area in which the production source image is displayed is not edited editable.

9. The storage medium storing the program according to claim 1, wherein the program causes the computer to perform further operations comprising converting the sentence data in the form of retrieved text data into a sentence image in the form of image data to be displayed, and wherein the sentence image is used in the form of converted image data to display at least a portion of the sentence image.

10. The storage medium storing the program according to claim 9, wherein editing the displayed sentence image includes overwriting and combining image data drawn based on the detected coordinate point onto the image data of the sentence image, and the combined image data of the sentence image is transmitted to another apparatus.

11. The storage medium storing the program according to claim 10, wherein the program causes the computer to perform further operations comprising drawing a time-series coordinate point sequence connecting detected coordinate points, and wherein editing the displayed sentence image superposes and combines image data corresponding to the drawn image with the image data of the sentence image.

12. The storage medium storing the program according to claim 9, wherein editing the displayed sentence image includes:

superposing text data corresponding to the detected coordinate points onto the image data of the sentence image; and converting the superposed text data into image data and combining the image data with the image data of the sentence data with timing of starting execution of transmitting the edited sentence image, and wherein the image data of the combined sentence image is transmitted to the other apparatus.

13. The storage medium storing the program according to claim 12, wherein the program causes the computer to perform further operations comprising recognizing an input character in accordance with the time-series coordinate point sequence connecting the detected coordinate points, and wherein when editing the displayed sentence image, text data corresponding to the recognized character is superposed onto the image data of the sentence image.

14. The storage medium storing the program according to claim 12, wherein the program causes the computer to perform further operations comprising:

selecting a character in accordance with the detected coordinate points; and moving the selected character in accordance with the detected coordinate points onto the sentence image displayed, and wherein when editing the displayed sentence image, text data corresponding to the character moved onto the character image is superposed on the image data of the sentence image.

15. The storage medium storing the program according to claim 12, wherein the editing includes deleting the text data superposed on the image data of the sentence data, in accordance with the detected coordinate points.

16. An information processing apparatus which displays information in at least first, second and third different display areas and which includes a coordinate input device, the apparatus comprising:
a processor; and
a memory coupled to the processor, the memory storing instructions that, when executed by the processor, control the processor to perform comprising:
receive an input corresponding to a user's operation in the third display area;
determine headword data corresponding to the received input and search, for sentence data that describes in detail a meaning of the headword data, a data group including at least sentence data in the form of text data corresponding to a plurality of pieces of headword data;
display, in the first display area, at least a portion of a sentence image based on retrieved sentence data;
copy at least a portion of the sentence image displayed in the first display area and display the copied portion in the second display area;
detect a coordinate point output from the coordinate input device;
edit the sentence image displayed in the second display area in accordance with the detected coordinate point; and
transmit the edited sentence image to another apparatus.

17. An information processing system including a plurality of information processing apparatuses each of which displays information in at least first, second and third different display areas and which includes a coordinate input device, wherein
each of the information processing apparatuses comprises:
a processor; and
a memory coupled to the processor, the memory storing instructions that, when executed by the processor, control the processor to perform operations comprising:
detecting a coordinate point output from the coordinate input device;
generating an image in accordance with the detected coordinate point;
receiving an image transmitted from another one of the information processing apparatuses;
displaying the received image;
editing the displayed image in accordance with the detected coordinate point; and
transmitting the generated image or the edited image to another one of the information processing apparatuses, and wherein
at least one of the plurality of information processing apparatus further receives
an input corresponding to a user's operation in the third display area; and wherein the processor is further controlled to perform operations comprising:
determining headword data corresponding to the input and searching, for sentence data that describes in detail a meaning of headword data, a data group including at least sentence data in the form of text data corresponding to a plurality of pieces of headword data;
displaying, in the first display area, at least a portion of a sentence image based on retrieved sentence data;
copying at least a portion of the sentence image displayed in the first display area and displaying the copied portion in the second display area
detecting a coordinate point output from the coordinate input device;
editing the sentence image displayed in the second display area in accordance with the detected coordinate point, and
transmitting the edited image to another one of the information processing apparatuses.

18. A method performed by a computer of an apparatus which is configured to display information in at least first, second and third different display areas and which includes a coordinate input device, the method comprising:
receiving an input corresponding to a user's operation in the third display area;
determining headword data corresponding to the received input and searching, for sentence data that describes in detail a meaning of the headword data, a data group including at least sentence data in the form of text data corresponding to a plurality of pieces of headword data;
displaying, in the first display area, at least a portion of a sentence image based on retrieved sentence data;
copying at least a portion of the sentence image displayed in the first display area and displaying the copied portion in the second display area;
detecting a coordinate point output from the coordinate input device;
editing the sentence image displayed in the second display area in accordance with the detected coordinate point; and
transmitting the edited sentence image to another apparatus.

* * * * *